US009031590B2

(12) United States Patent
Park et al.

(10) Patent No.: US 9,031,590 B2
(45) Date of Patent: May 12, 2015

(54) METHOD FOR COOPERATIVE DATA TRANSMISSION AMONG TERMINALS, AND METHOD FOR CLUSTERING COOPERATIVE TERMINALS FOR SAME

(75) Inventors: Sungho Park, Anyang-si (KR); Sunam Kim, Anyang-si (KR); Binchul Ihm, Anyang-si (KR); Jinyoung Chun, Anyang-si (KR); Jiwon Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 234 days.

(21) Appl. No.: 13/642,503

(22) PCT Filed: Apr. 19, 2011

(86) PCT No.: PCT/KR2011/002781
§ 371 (c)(1),
(2), (4) Date: Oct. 19, 2012

(87) PCT Pub. No.: WO2011/132908
PCT Pub. Date: Oct. 27, 2011

(65) Prior Publication Data
US 2013/0029591 A1  Jan. 31, 2013

Related U.S. Application Data

(60) Provisional application No. 61/325,385, filed on Apr. 19, 2010, provisional application No. 61/333,236, filed on May 10, 2010.

(51) Int. Cl.
*H04B 7/00* (2006.01)
(Continued)

(52) U.S. Cl.
CPC ............ *H04L 67/1095* (2013.01); *H04B 7/026* (2013.01); *H04W 88/04* (2013.01); *H04W 76/023* (2013.01); *H04W 84/18* (2013.01)

(58) Field of Classification Search
CPC .......... H04W 72/0406; H04W 76/023; H04W 72/04; H04W 72/121; H04W 76/025; H04W 84/18; H04W 84/047; H04B 7/026; H04B 7/0266
USPC ............ 455/450–452.1, 509–510, 41.2–41.3, 455/517–519
See application file for complete search history.

(56) References Cited

U.S. PATENT DOCUMENTS

| 7,623,589 B2 * | 11/2009 | Oyman et al. ................. 375/267 |
| 8,576,772 B2 * | 11/2013 | Cox et al. ...................... 370/328 |
| 2008/0165880 A1 * | 7/2008 | Hyon et al. .................... 375/267 |
| 2008/0282133 A1 * | 11/2008 | Lo et al. ......................... 714/786 |
| 2010/0312897 A1 * | 12/2010 | Allen et al. .................... 709/227 |

(Continued)

FOREIGN PATENT DOCUMENTS

| KR | 10-2009-0092429 | 9/2009 |
| KR | 10-2009-0117244 | 11/2009 |
| KR | 10-2010-0035088 | 4/2010 |

OTHER PUBLICATIONS

In the PCT International Search Report Application Serial No. PCT/KR2011/002781 dated Nov. 29, 2011, 9 pages.

*Primary Examiner* — Simon Nguyen
(74) *Attorney, Agent, or Firm* — Lee, Hong, Degerman, Kang & Waimey

(57) ABSTRACT

The present description relates to a method in which a base station clusters cooperative terminals so as to enable cooperative data transmission among terminals. The clustering method comprises the following steps: identifying terminals which can transmit data of an opponent terminal; generating a cooperative cluster containing the identified terminals; transmitting information on the cooperative cluster to the terminals which belongs to the cooperative cluster; and receiving data of a second terminal from a first terminal, which are terminals belonging to the cooperative cluster.

21 Claims, 13 Drawing Sheets

(51) Int. Cl.
*H04W 72/00* (2009.01)
*H04L 29/08* (2006.01)
*H04B 7/02* (2006.01)
*H04W 76/02* (2009.01)
*H04W 84/18* (2009.01)
*H04W 88/04* (2009.01)

(56) References Cited

U.S. PATENT DOCUMENTS

2011/0134827 A1* 6/2011 Hooli et al. .................. 370/315
2011/0170450 A1* 7/2011 Juntti et al. .................. 370/252
2013/0003573 A1* 1/2013 Reznik et al. ................ 370/252

* cited by examiner (a)

(b)

(a)

(b)

METHOD FOR COOPERATIVE DATA TRANSMISSION AMONG TERMINALS, AND METHOD FOR CLUSTERING COOPERATIVE TERMINALS FOR SAME

CROSS-REFERENCE TO RELATED APPLICATIONS

This application is the National Stage filing under 35 U.S.C. 371 of International Application No. PCT/KR2011/002781, filed on Apr. 19, 2011, which claims the benefit of U.S. Provisional Application Ser. No. 61/325,385, filed on Apr. 19, 2010, and U.S. Provisional Application Ser. No. 61/333,236 filed on May 10, 2010, the contents of which are all hereby incorporated by reference herein in their entirety.

TECHNICAL FIELD

The present invention relates to cooperative communication.

BACKGROUND ART

MIMO, which is an abbreviation for Multiple-Input Multiple-Output, refers to a scheme capable of improving data transmission/reception efficiency using multiple transmit antennas and multiple receive antennas, instead of using a single transmit antenna and a single receive antenna. In other words, MIMO technology allows a transmitter or a receiver of a wireless communication system to use multiple antennas, so that capacity or performance can be improved. Herein, MIMO will be called multi-antenna.

In summary, multi-antenna technology applies technology of completing a whole message by gathering data fragments received via several antennas without depending on a single antenna path in order to for one whole message. Since MIMO technology can improve a data transmission rate in a specific range or increase system range at a specific data transmission rate, it is next-generation mobile communication technology which can be widely used in mobile communication terminals, relays, etc. Attention is being paid to this technology as a next-generation technology capable of overcoming limitations in mobile communication transmission capacity that has become a critical situation due to expansion of data communication.

Generally, when a transport channel experiences deep fading, unless a different version or a replica of a transmitted signal is additionally transmitted, a receiver can hardly determine the transmitted signal. A source corresponding to such different version or replica is called diversity which is one of the most significant factors contributing to reliable transmission over wireless channels.

The use of diversity can maximize data transmission capacity or data transfer reliability. A system implementing diversity using multiple transmit antennas and multiple receive antennas is called a MIMO system or a multi-antenna system.

To overcome performance degradation caused by channel fading of wireless communication, studies have been extensively conducted on a spatial diversity scheme using a MIMO system.

The MIMO system provides advantages of high data transmission rate, low error rate, and channel capacity increase by implementing two or more antennas in a transmitter and a receiver.

However, in spite of the advantages of the MIMO system, it is generally impossible to achieve the MIMO system in uplink due to restrictions such as size, weight, hardware complexity, etc.

As an alternative for this problem, a cooperative diversity scheme has been proposed. The object of the cooperative diversity scheme is for each terminal to obtain advantages of spatial diversity gain increase, error rate reduction, and channel capacity increase. To this end, the cooperative diversity scheme forms a virtual MIMO system using a relay or a femto cell so that neighboring terminals share resources such as an antenna and a frequency band of the relay. Thus, the advantages of the MIMO system can be obtained even through terminals having at least one antenna.

In this way, the cooperative diversity scheme is based on use of an additional relay.

However, a scheme capable of performing cooperative transmission using terminals without an additional relay is needed.

DETAILED DESCRIPTION OF THE INVENTION

Technical Problems

It is an object of this specification to provide a method capable of performing cooperative transmission using terminals. Specifically, it is an object of this specification to provide a method for detecting a terminal that requests cooperative transmission and a terminal that can respond to the request.

It is another object of this specification to provide a method for efficiently allocating resources according to transmission type while cooperative transmission is performed.

Technical Solutions

To achieve the above objects and in accordance with an aspect of this specification, there is provided a method for, at a base station, clustering cooperative terminal candidates for cooperative data transmission. The method may include identifying terminals which are capable of transmitting data of an another terminal; generating a cooperative cluster including the identified terminals; transmitting information about the cooperative cluster to the terminals belonging to the cooperative cluster; and receiving data of a second terminal from a first terminal among the terminals belonging to the cooperative cluster.

The identifying may include determining whether the terminals can transmit data of the another terminal based on information of each terminal.

The identifying may include one or more of receiving, by the base station, a cooperation consent message from each terminal; and receiving a cooperative transmission message from each terminal.

The method may further include allocating an uplink resource to the first terminal; and allocating an uplink resource to the second terminal.

In accordance with another aspect of this specification, there is provided a method for, at a terminal, transmitting data to a base station in cooperation with an another terminal. The method may include receiving a cooperation consent message from the another terminal; transmitting a cooperation request message to the another terminal based on the cooperation consent message, if data to be transmitted to the base station is present; receiving information about a resource allocated by the another terminal from the another terminal; and transmitting the data to the another terminal.

The transmitting the data may includes transmitting the data to the another terminal; and transmitting the data to the base station.

In accordance with still another aspect of this specification, there is provided a method for, at a terminal, transmitting data to a base station in cooperation with an another terminal. The method may include transmitting a cooperation request message to the another terminal, if data to be transmitted to the base station is present; receiving a cooperation acceptance message from the another terminal; and transmitting the data to the another terminal based on information about a resource allocated by the other terminal included in the cooperation acceptance message or another message.

The method may further include receiving the another message including the information about the resource allocated by the another terminal.

The cooperation request message may include an allocation request for a resource of the another terminal.

In accordance with a further aspect of this specification, there is provided a base station for clustering cooperative terminal candidates for cooperative data transmission. The base station may include a controller configured to identify terminals which are capable of transmitting data of an another terminal and generate a cooperative cluster including the identified terminals; and a transceiver configured to transmit information about the cooperative cluster to the terminals belonging to the cooperative cluster and receive data of a second terminal from a first terminal among the terminals belonging to the cooperative cluster, according to control of the controller.

The controller may determine whether the terminals can transmit data of the another terminal based on information of each terminal. The controller may identify the terminals based on a cooperation consent message received from each terminal.

In accordance with another aspect of this specification, there is provided a terminal for transmitting data to a base station in cooperation with an another terminal. The terminal may include a controller; and a transceiver configured to receive a cooperation consent message from the another terminal, transmit a cooperation request message to the another terminal based on the cooperation consent message when data to be transmitted to the base station is present, and transmit the data to the another terminal upon receiving information about a resource allocated by the another terminal from the another terminal, according to control of the controller.

In accordance with another aspect of this specification, there is provided a terminal for transmitting data to a base station in cooperation with an another terminal. The terminal may include a controller; and a transceiver configured to transmit a cooperation request message to the another terminal when data to be transmitted to the base station is present and, upon receiving a cooperation acceptance message from the another terminal, transmitting the data to the another terminal based on information about a resource allocated by the other terminal included in the cooperation acceptance message or another message, according to control of the controller.

Advantageous Effects

According to the proposals of the present invention, data transmission success rate can be increased by cooperatively transmitting data with the aid of other terminals when a terminal is in a poor channel state or is not assigned sufficient resources for transmitting data.

BEST MODE FOR CARRYING OUT THE INVENTION

Figure 1:
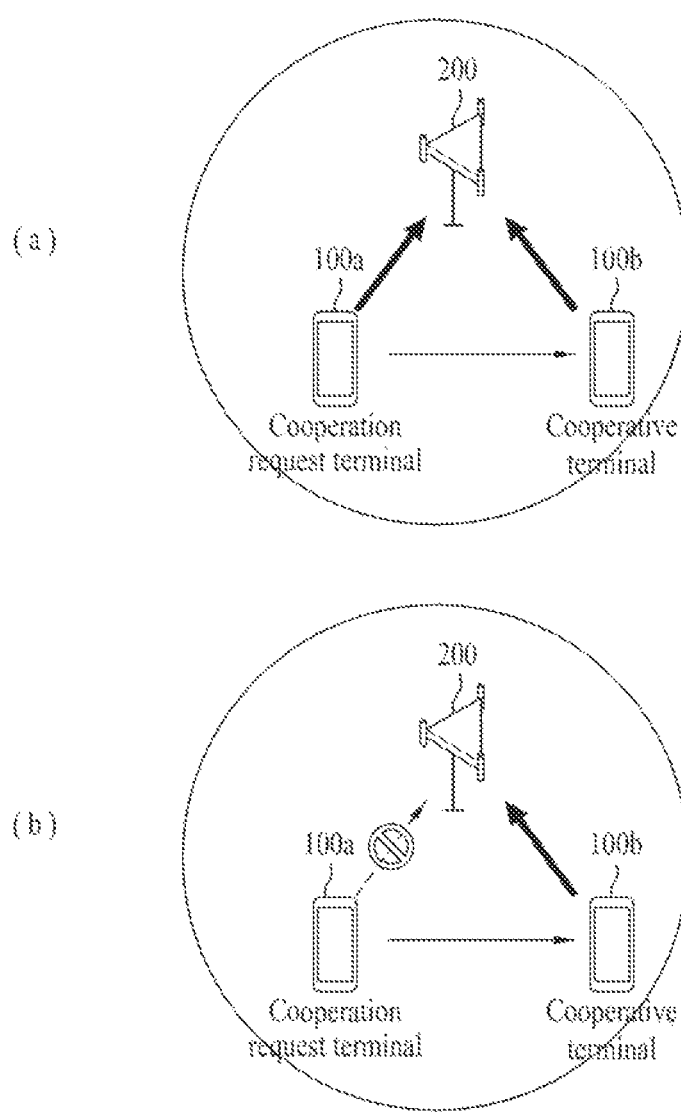
FIG. 1 is a diagram exemplarily showing one concept of cooperative transmission.

The present invention is applied to cooperative diversity. However, the present invention is not limited thereto and may be applied to all communication systems and methods and other systems to which the technical scope of the present invention is applicable.

Technical terms used in this specification are used merely to illustrate specific embodiments, and it should be understood that they are not intended to limit the present disclosure. So long as not defined otherwise, all terms used herein including technical terms may have the same meaning as those generally understood by persons skilled in the art to which the present disclosure belongs, and should not be construed in an excessively comprehensive manner or an extremely restricted manner. In addition, if a technical term used in the description of the present disclosure is an erroneous term that fails to clearly express the idea of the present disclosure, it should be replaced by a technical term that can be properly understood by those skilled in the art. In addition, general terms used in the description of the present disclosure should be construed according to definitions in dictionaries or according to the context, and should not be construed in an excessively restrained manner.

A singular representation may include a plural representation unless the context clearly indicates otherwise. It will be understood that the terms 'comprising', 'include', etc., when used in this specification, specify the presence of several components or several steps and mean that all of the components or steps may not be necessarily included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Exemplary embodiments of the present invention will be described below in detail with reference to the accompanying drawings in which the same reference numbers are used throughout this specification to refer to the same or like parts. In describing the present invention, a detailed description of known functions and configurations will be omitted when it may obscure the subject matter of the present invention. The accompanying drawings are used to help easily understood the technical idea of the present invention and it should be understood that the idea of the present invention is not limited by the accompanying drawings. The idea of the present invention should be construed to extend to any variations, equivalents and replacements besides the accompanying drawings.

Although the term 'terminal' is illustrated in the drawings, the terminal may be called a User Equipment (UE), a Mobile Equipment (ME), a Mobile Station (MS), a User Terminal (UT), a Subscriber Station (SS), a wireless device, a handheld device, or an Access Terminal (AT). The terminal may be a type of portable equipment having a communication function, such as a cellular phone, a Personal Digital Assistant (PDA), a smart phone, a wireless modem, and a notebook, or may be a type of fixed equipment, such as a PC and a vehicle-mounted device.

FIG. 1 is a diagram exemplarily illustrating one concept of cooperative transmission.

As can be appreciated with reference to FIG. 1, a Base Station (BS) 200 and terminals are illustrated. In this case, a terminal 100a may request cooperation of another terminal 100b when a channel state is not good or sufficient resources are not allocated. The terminal 100b may transmit data of the terminal 100a to the BS 200 in response to the cooperation request.

As shown in FIG. 1, the terminal that requests cooperation is denoted by a 'cooperation request terminal' and the terminal that responds to the cooperation request is denoted by a 'cooperative terminal'.

The cooperation request terminal may be called a cooperation seeking terminal. The cooperative terminal may be called a cooperative transmission terminal or a cooperation providing terminal.

In FIG. 1, the number of cooperative terminals 100b that transmit data of the terminal 100a in response to the cooperation request is 1. In this way, if the number of cooperative terminals is limited to 1, processing delay is reduced and it is relatively easy to implement cooperative transmission, whereas combining gain is decreased due to a small number of cooperative terminals and a transmission success rate may be relatively decreased due to a poor link or channel state (or channel quality) between the cooperative terminal 100b and the BS 200.

In FIG. 1(a), the cooperation request terminal 100a transmits data thereof to another terminal 100b and also to the BS 200. If the terminal 100b transmits the data of the terminal 100a to the BS 200, the BS 200 may obtain additional combining gain.

Meanwhile, in FIG. 1(b), the cooperation request terminal 100a transmits data thereof to another terminal 100b and does not transmit the data of the terminal 100a to the BS 200.

Figure 2:
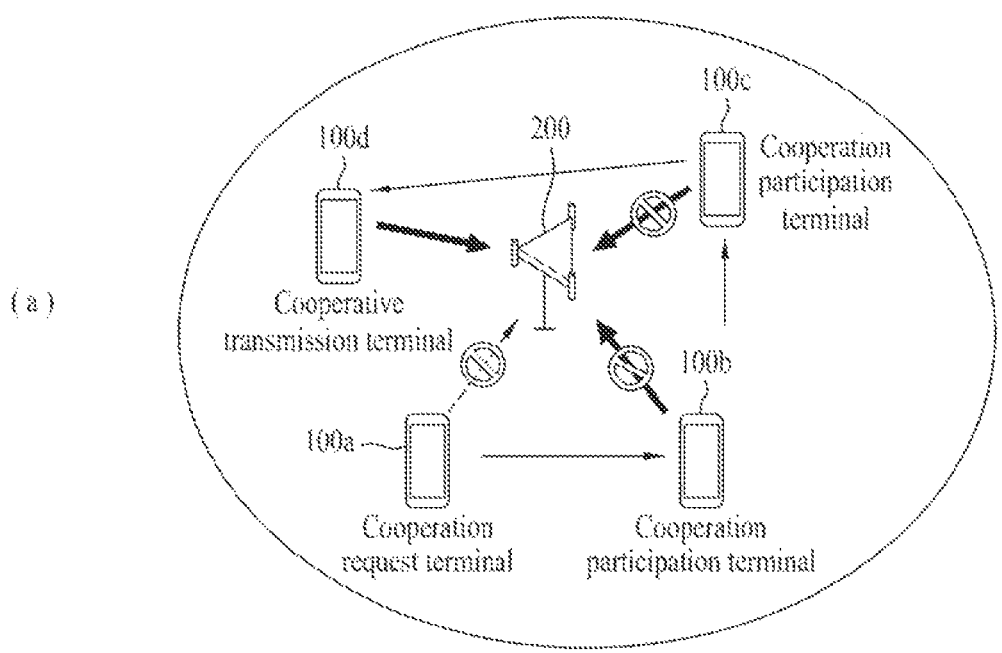
FIG. 2 is a diagram exemplarily showing another concept of cooperative transmission.
Figure 2:
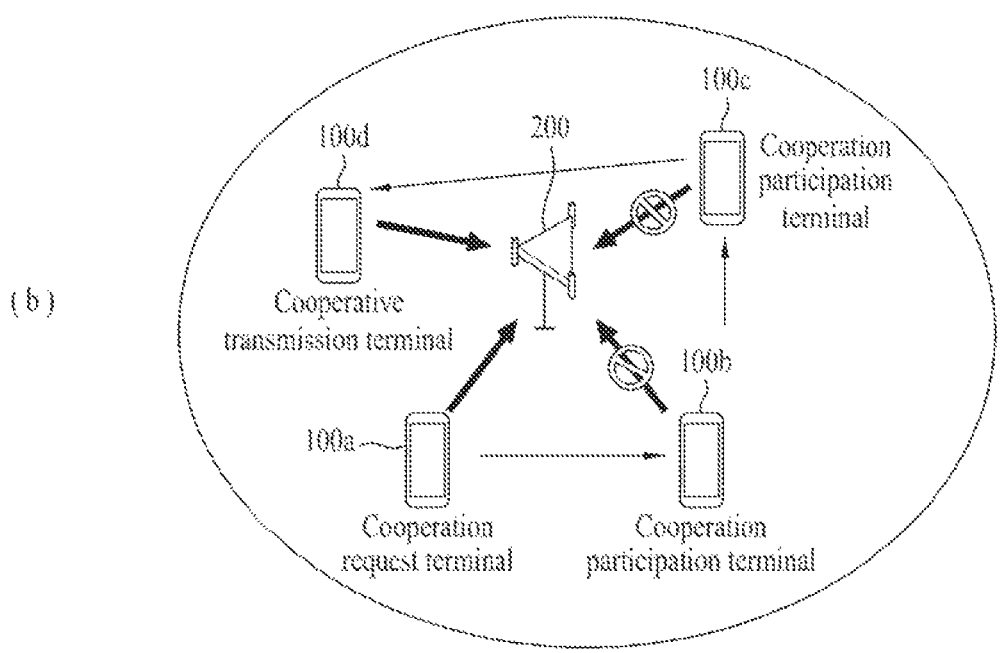

FIG. 2 is a diagram exemplarily showing another concept of cooperative transmission.

As can be appreciated with reference to FIG. 2, a BS 200 and a plurality of terminals 100a, 100b, 100c, and 100d are illustrated. The terminal 100a may request cooperation of another terminal 100b due to a poor channel state, insufficient resource allocation, etc. The terminal 100b may request cooperation of another terminal 100c and the terminal 100c may also request cooperation of another terminal 100d.

In this case, only one of the terminals 100b, 100c, and 100d may transmit data of the terminal 100a to the BS 200 in response to the cooperation request.

As shown in FIG. 2, the terminal that requests cooperation is denoted by a 'cooperation request terminal', each of the terminals 100b and 100c that participates in cooperation is denoted by a 'cooperation participation terminal', and the terminal 100d that participates in cooperation and actually transmits data is denoted by a 'cooperative transmission terminal'.

The cooperation request terminal may be called a cooperation seeking terminal. The cooperative transmission terminal may be called a cooperative terminal or a cooperation providing terminal.

Meanwhile, in FIG. 2(a), among the plurality of cooperation participation terminals 100b, 100c, and 100d that respond to the cooperation request, the number of terminals that actually transmit data of the terminal 100a to the BS 200 is 1. In this case, the cooperation request terminal 100a does not transmit data thereof to the BS 200.

In this way, a scheme in which only one terminal among the plurality of cooperation participation terminals 100b, 100c, and 100d responding to cooperation transmits the data of the cooperation request terminal 100a has an advantage of guaranteeing successful transmission by selecting a terminal having the best link or channel quality and transmitting the data through the selected terminal. However, since the data should sequentially pass through the plurality of cooperation participation terminals 100b, 100c, and 100d, delay may occur. Further, since the number of terminals that actually transmit the data of the terminal 100a to the BS 200 is only one, less combining gain is additionally obtained.

On the other hand, in FIG. 2(b), the cooperation request terminal 100a transmits data thereof to the BS 200 and the cooperative transmission terminal 100d also transmits the data of the cooperation request terminal 100a to the BS 200.

Figure 3:
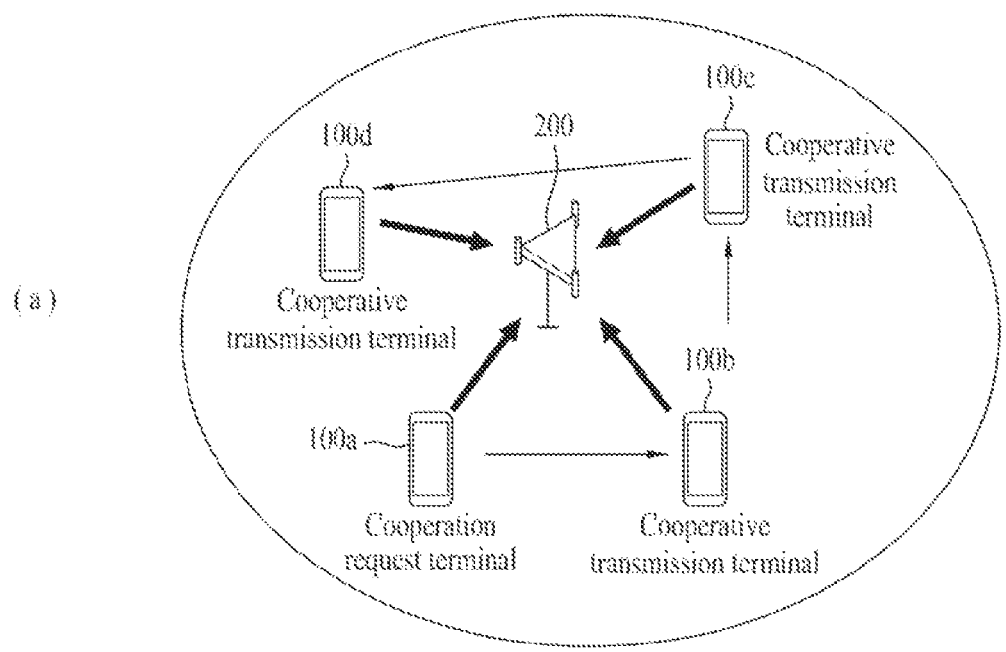
FIG. 3 is a diagram exemplarily showing still another concept of cooperative transmission.
Figure 3:
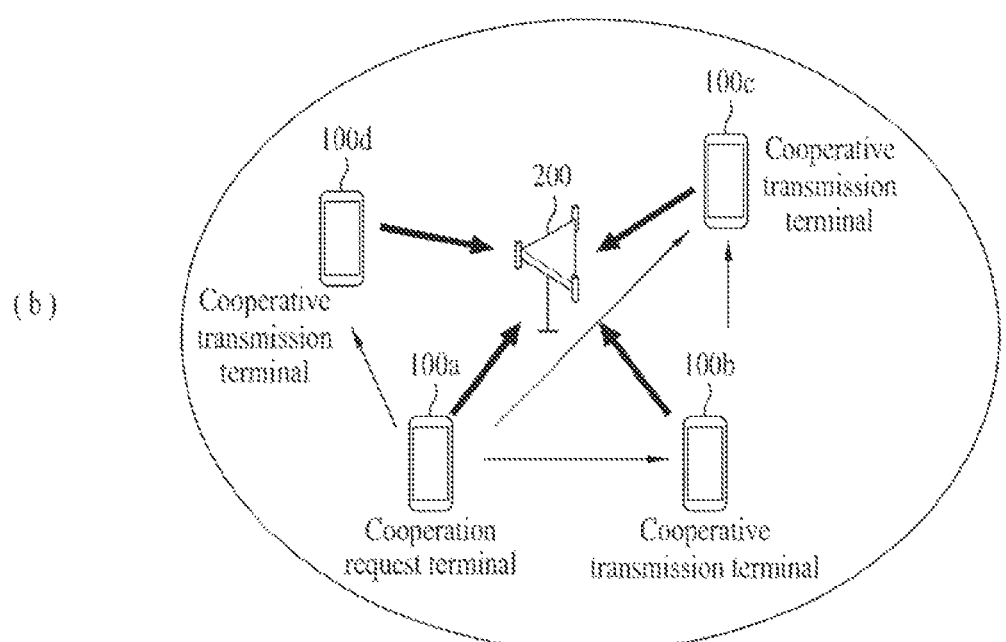

FIG. 3 is a diagram exemplarily showing still another concept of cooperative transmission As can be appreciated with reference to FIG. 3(a), a BS 200 and a plurality of terminals 100a, 100b, 100c, and 100d are illustrated. In this case, the terminal 100a may request cooperation of another terminal 100b due to a poor channel state, insufficient resource allocation, etc. The terminal 100b may request cooperation of another terminal 100c and the terminal 100c may also request cooperation of another terminal 100d.

Thus, one or more terminals among the terminals 100b, 100c, and 100d may transmit data of the terminal 100a to the BS 200 in response to the cooperation request.

In FIG. 3(a), all of the terminals 100b, 100c, and 100d transmit the data of the terminal 100a to the BS 200 in response to the cooperation request. Accordingly, each of the terminals 100*b*, 100*c*, and 100*d* is denoted by a 'cooperative transmission terminal' in FIG. 3(*a*).

Meanwhile, referring to FIG. 3(*b*), due to a poor channel state, insufficient resource allocation, etc. the cooperation request terminal 100*a* may request cooperation of terminals 100*b*, 100*c*, and 100*d*.

A plurality of terminals among the terminals 100*b*, 100*c*, and 100*d* may transmit data of the terminal 100*a* to the BS 200 in response to the cooperation request.

In this way, such a method for a plurality of terminals to transmit the data of the terminal 100*a* to the BS can greatly increase a transmission success rate but may complicate implementation of cooperative transmission and generate delay for cooperative transmission.

As seen in the foregoing description with reference to FIG. 1 to FIG. 3, an entity that receives control information for cooperative transmission and the contents of an uplink resource allocation message between a terminal and a BS vary according to each cooperative transmission method. In this case, a link between a terminal and a BS and a link between terminals need to be separately considered for a resource allocation request and resource allocation. In other words, the resource allocation request may be divided into an uplink resource allocation request transmitted from a terminal to a BS and a resource allocation request transmitted from a terminal to another terminal. Similarly, resource allocation may be divided into uplink resource allocation transmitted from a BS to a terminal and resource allocation transmitted from a terminal to another terminal.

Figure 4:
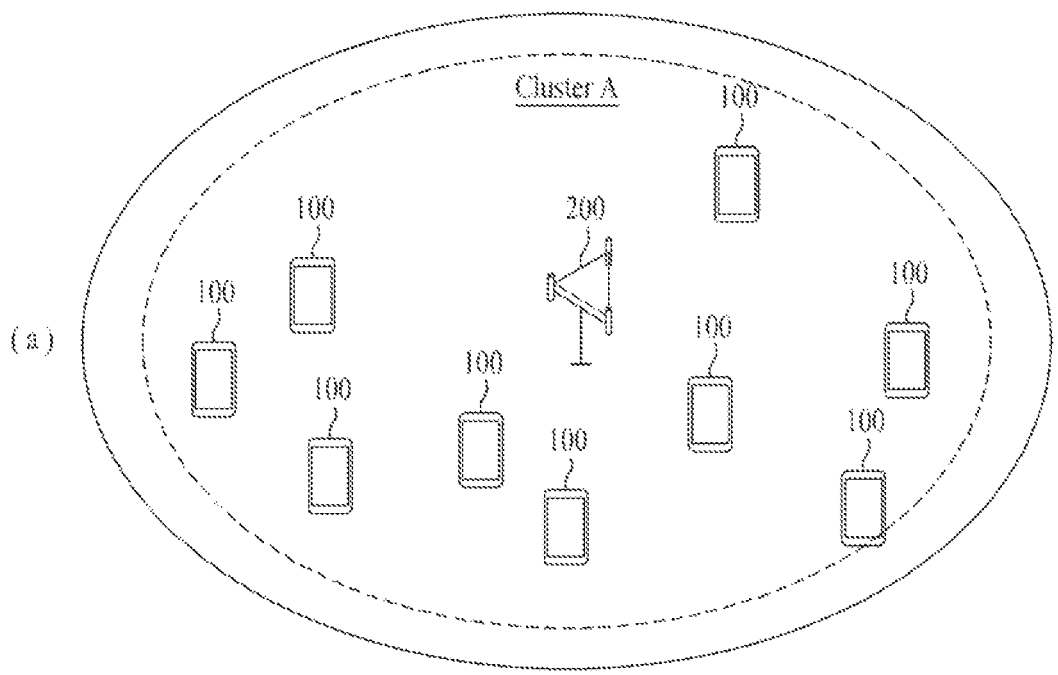
FIG. 4 illustrates the concept of a cooperative cluster of terminals.
Figure 4:
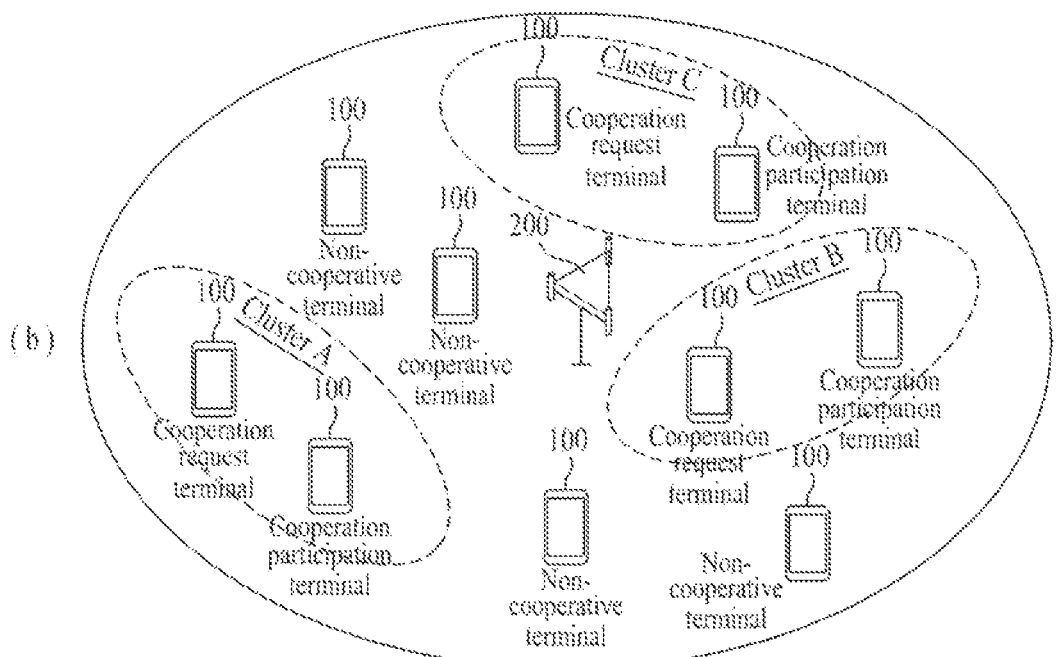

FIG. 4 illustrates the concept of a cooperative cluster of terminals.

Terminals may be classified into non-cooperative terminals, cooperation-capable terminals, cooperation participation terminals, cooperative transmission terminals, cooperation request terminals, and the like, according to operations and roles of the terminals. The non-cooperative terminals may be called single transmission terminals. The cooperation-capable terminals may be called cooperative terminal candidates. The cooperation request terminals may be called cooperation seeking terminals. The cooperative transmission terminals may be called cooperative terminals or cooperation providing terminals.

As described earlier, a cooperation participation terminal refers to a terminal that participates in cooperative transmission but does not transmit data to a BS.

In this case, a terminal that accepts a cooperation request may be called a cooperation acceptance terminal. The cooperation acceptance terminal includes both a cooperative transmission terminal (or a cooperative terminal) and a cooperation participation terminal.

The cooperation-capable terminals may be grouped by a virtual group called a cooperative cluster as shown in FIG. 4.

Specifically, the cooperative cluster may include all cooperation-capable terminals as shown in FIG. 4(*a*) or include cooperation-capable terminals based on geometry information.

The cooperative cluster may be generated by a BS when terminals enter the BS (this may be called network entry) or may be generated by forming a direct cooperation relationship between terminals.

In the case in which the BS generates the cooperative cluster, information about the cooperative cluster may be periodically broadcast by the BS. Alternatively, the information about the cooperative cluster may be unicast at the request of a terminal.

If terminals autonomously form the cooperative cluster, information about the cooperative cluster may be unicast or multicast by the terminals or a certain terminal.

In FIG. 4, cooperative clusters are generated only for terminals belonging to a cell of one BS in cooperative transmission. However, the operative clusters may be generated even for terminals belonging to different BSs. A plurality of BSs in which the cooperative clusters can be generated may be called cooperative BSs or cooperative (e)NodeBs.

The concept of the cooperative cluster for causing terminals to cooperatively transmit data has been described. Hereinbelow, requirements necessary when terminals cooperatively transmit data will be described.

Requirements for Cooperative Transmission of Terminals

Requirements which should be additionally defined to support cooperative transmission of terminals may be summarized as follows.

1. All terminals support cooperative transmission.

a) A cooperation-capable terminal may operate as a cooperation-capable transmission mode or a single transmission mode according to whether the terminal participates in cooperative transmission. That is, all terminals supporting a terminal cooperative transmission system should be able to perform cooperative transmission and, under specific conditions, the terminals may not participate in cooperative transmission. The terminals which do not participate in cooperative transmission may operate in the above-mentioned cooperation-capable transmission mode or single transmission mode.

At this time, the specific conditions may be conditions for reducing power consumption of terminals. To reduce power consumption of a terminal, a method for controlling cooperative transmission participation of the terminal will be described in detail below.

For instance, terminals that satisfy an initial condition (a threshold value or weight value condition) for cooperative transmission participation of terminals, terminals that accept a cooperative transmission request, and terminals that participate in cooperative transmission by a BS may participate in actual cooperative transmission and the other terminals may operate in the single transmission mode.

b) Cooperation-capable terminals transition to a cooperation-capable transmission state when data thereof is not transmitted.

c) Cooperation-capable terminals and cooperation request terminals may use a frame structure having a different form from a single transmission mode in order to enable cooperative transmission or to transfer or exchange data for cooperative transmission.

As one embodiment, a relay zone is used as resources for exchanging messages such as a cooperation consent message, a cooperation request message, and a cooperation acceptance message and/or for transmitting and receiving data between terminals. For example, an AAI downlink relay zone and/or an AAI uplink relay zone of IEEE 802.16m may be used for exchanging messages and data between terminals.

2. Cooperation-capable terminals have a different paging interval from single transmission terminals to reduce power consumption.

a) Extension of one sleep cycle (sleep duration) is not applied.

b) Cooperation-capable terminals have a shorter paging unavailable interval or longer paging listening interval than single transmission terminals in an idle mode.

3. Cooperation-capable terminals do not apply extension of a sleep cycle (sleep duration) for low power consumption.

a) Cooperation-capable terminals have a shorter sleep cycle than single transmission terminals in a sleep mode for cooperative transmission.

b) Cooperation-capable terminals have a shorter sleep window or a longer listening window than single transmission terminals.

c) If single transmission terminals have no reception data, a scheme of extending a sleep window of a sleep cycle is used in order to reduce power consumption and this extension is limited in the case of cooperation-capable terminals such that the sleep window cannot be extended.

d) If a BS recognizes that a corresponding terminal is a cooperation-capable terminal, the BS need not transmit an indicator indicating that there is no transmission traffic to the cooperation-capable terminal. For example, the BS may not transmit negative indication in a traffic indication message or may transmit an indicator indicating a cooperative transmission terminal in a listening window so that the terminal does not enter a sleep mode.

Hereinafter, a search method representing how terminals search for each other prior to cooperative data transmission will be described in detail.

First, in order for one or more terminals to form a cooperative relation, the terminals should be aware of information about cooperation-capable terminals with which the terminals can form a cooperative relation. In this case, a method for searching for a cooperation-capable terminal may be divided into a pass mode and an active mode according to whether the BS informs the terminals of the cooperation-capable terminals and whether the terminals themselves search for the cooperation-capable terminals.

I. Passive Mode

The passive mode refers to a scheme in which a BS searches for cooperation-capable terminals (cooperative terminal candidates).

Namely, the BS searches for cooperative terminal candidates using information such as location information of terminals, receive powers of terminals, and cooperative transmission ratios of terminals.

1) The BS compares receive powers of terminals with a specific threshold value and periodically generates and updates a list of terminals having a high receive SINR with respect to terminals having a low receive power.

For example, the BS generates a cooperative terminal candidate list/a cooperative (transmission) cluster list and transmits the same to a terminal.

Herein, the threshold value is a reference value capable of determining a terminal necessary for cooperative transmission and may be a predefined value or a value determined by the BS.

If a Location-Based Service (LBS) is available, the cooperative terminal candidate list may be generated with respect to cooperative terminal candidates around terminals having a low receive SINR, based on location information.

The BS may assign unique temporary MS IDs in a cluster to cooperative terminal candidates in the cluster.

2) If the BS determines that cooperative transmission is needed, the BS allocates resources to terminals by forming a cooperative transmission relation between terminals with reference to the cooperative terminal candidate list.

Grant information transmitted by the BS may include at least one of a Mobile Station ID (MSID) of a cooperative transmission terminal, and an MSID of a cooperative terminal candidate, a cooperative cluster ID for terminals that are engaged in cooperative transmission, and temporary ID information.

The cooperative cluster ID may be configured using a part or all of MSIDs of terminals included in a cooperative cluster.

Alternatively, the cooperative cluster ID is configured using a value determined arbitrarily by the BS. For instance, a random value or an index value according to cooperative cluster formation order may be used to configure the cooperative cluster ID.

3) A terminal may perform cooperative transmission together with a terminal of a neighboring BS. That is, a terminal may search for a terminal of a neighboring BS.

In other words, the BS may exchange the cooperative terminal candidate list with a neighboring BS and a terminal may directly receive the cooperative terminal candidate list from the neighboring BS.

Figure 5:
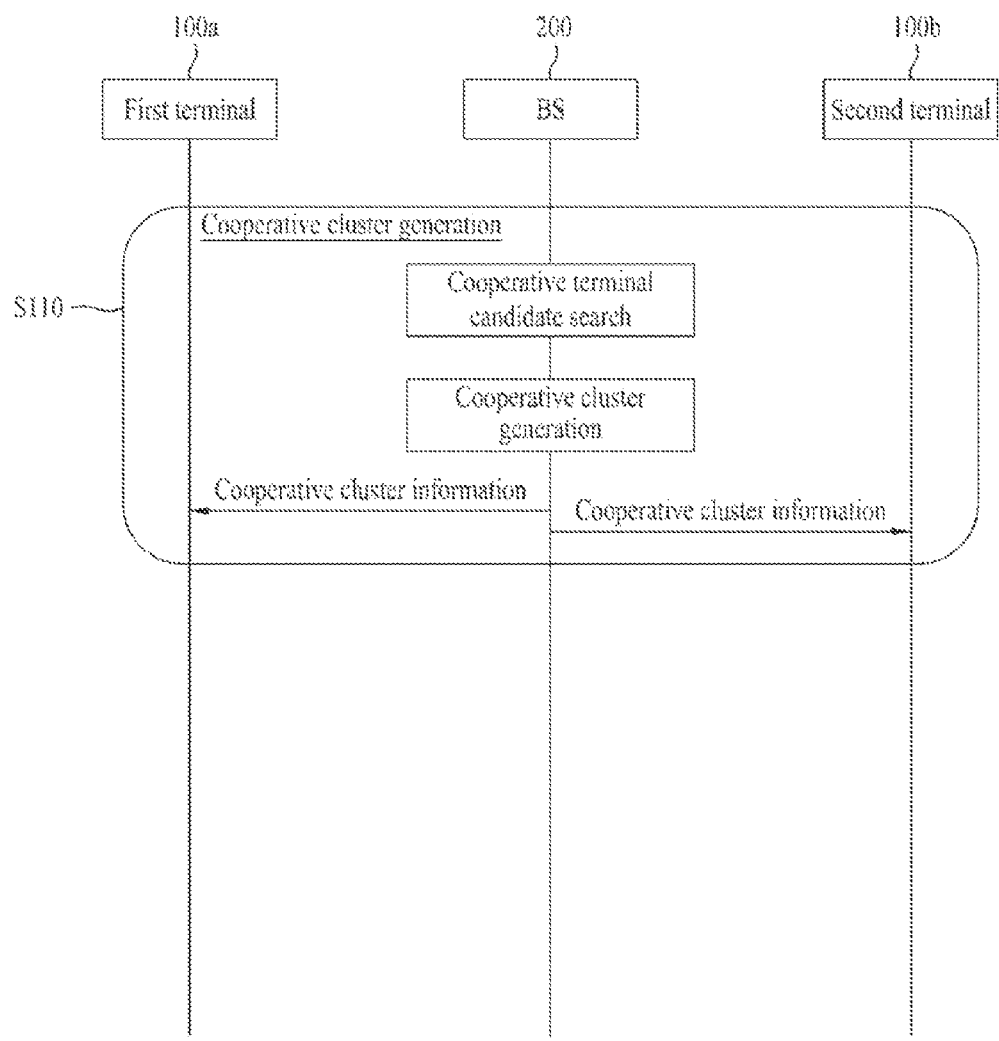
FIG. 5 exemplarily illustrates a method for searching for a cooperative terminal candidate in a passive mode proposed in the present invention.

FIG. 5 exemplarily illustrates a method for searching for a cooperative terminal candidate in a passive mode proposed in the present invention.

Referring to FIG. 5, terminals can search for a cooperative terminal candidate based on cooperative cluster information generated through a cooperative cluster generation process S110.

The cooperative cluster generation process S110 is as follows.

A BS searches for (or selects) cooperative terminal candidates based on location information of terminals, receive powers of terminals, and cooperative transmission ratios of terminals.

Next, the BS generates a cooperative cluster (or cooperative terminal candidate list) for the selected cooperative terminal candidates and informs a first terminal 100a and a second terminal 100b of information about the generated cooperative cluster.

The cooperative cluster generation process S110 will now be described in more detail.

The BS 200 generates a cooperative cluster including the first terminal 100a and the second terminal 100b and transmits information about the generated cooperative cluster to the two terminals 100a and 100b. The BS 200 may generate the cooperative cluster including the first terminal 100a and the second terminal 100b using subscriber information of terminals or information such as a Channel Quality Indicator (CQI) or an SINR which can be received from terminals.

After generating the cooperative cluster, the BS 200 assigns an ID to the generated cooperative cluster and may transmit information about the cluster ID. In addition to an MSID (or Station ID (STID)) of each terminal, the BS 200 may assign an temporary MS ID which can protect information of each MS and can distinguish between terminals within each cluster and may transmit the cooperative cluster information including the temporary MS ID to each terminal.

Thus, the BS 200 may transmit the cooperative cluster information including basic information for cooperative transmission such as an ID of a cooperative transmission cluster and an temporary MS ID to each terminal periodically or upon occurrence of an event.

The passive mode in which a BS searches for cooperative terminal candidates has been described hereinabove. An active mode in which terminals directly search for cooperative terminal candidates will be described below.

II. Active Mode

The active mode refers to a scheme in which a terminal searches for cooperative terminal candidates by a scheme representing cooperative participation consent. The active mode may be classified into two types, Case 1 and Case 2, according to whether information about cooperative terminal candidates is transmitted to a terminal through a BS or whether the information is transmitted directly to a terminal.

Namely, in Case 1, Information about cooperative terminal candidates is transmitted through a BS to a terminal, and, in Case 2, information about cooperative terminal candidates is directly exchanged between terminals.

(a) Case 1

Terminals transmit information about participation consent for cooperative transmission to a BS. The information about participation consent may include at least one of a cooperation consent message, a part or all of MSIDs, and temporary MS IDs.

The temporary MS ID is generated by a terminal and may be a random value or a sequence.

The cooperation consent message is a 1-bit cooperation indicator.

Next, the BS generates a cooperative terminal candidate list based on information transmitted by the terminals. That is, the BS establishes a cooperative cluster. If an LBS is available, the BS may intelligently configure a list of cooperative terminal candidates around corresponding terminals.

The BS may periodically transmit the cooperative terminal candidate list including cell IDs to a neighboring BS so that a home terminal can support cooperative transmission with a terminal of the neighboring BS.

The BS may periodically broadcast the cooperative terminal candidate list to terminals or multicast the cooperative terminal candidate list to terminals having a low receive SINR.

The BS may unicast the cooperative terminal candidate list to a terminal requiring more than a predetermined number of retransmissions or a specific terminal during occurrence of an event.

If an LBS is available, the cooperative terminal candidate list is unicast to a terminal requiring cooperative transmission.

Next, a cooperation request terminal transmits a cooperation request message to cooperative terminal candidates with reference to the cooperative terminal candidate list received from the BS.

Here, each of the cooperation request messages transmitted between terminals may include at least one of a cooperation request indicator, a part or all of MSIDs of transmission terminals, a part or all of MSIDs of reception terminals, temporary MS IDs of the transmission terminals, and temporary MS IDs of the reception terminals.

Next, terminals that have received the cooperation request messages may transmit cooperation acceptance messages.

Each of the cooperation acceptance message may include at least one of a 1-bit cooperation acceptance indicator, a part or all of MSIDs of transmission terminals, temporary MS IDs of the transmission terminals, a part or all of MSIDs of cooperation request terminals, temporary MS IDs of cooperation request terminals, and a resource allocation message (grant) for the cooperation request terminals.

For example, the cooperation request indicator and the cooperation acceptance indicator may be comprised of two bits as follows.

E.g.) 0bxx (2 bits)—MSB: Acceptance/Request, LSB: No/Yes

0b00: Cooperation non-acceptance
0b01: Cooperation acceptance
0b10: Cooperation request
0b11: Reserved All terminals that have received the cooperation request message transmit a cooperation acceptance or non-acceptance message. Alternatively, only terminals accepting cooperation transmit the cooperation acceptance message.

If grant information about a cooperation request terminal is not included in the cooperation acceptance message, the cooperation request terminal transmits a resource allocation request message to cooperation acceptance terminals.

The resource allocation request message may include at least one of all or a part of MSIDs of transmission terminals, temporary MS IDs of transmission terminals, all or a part of MSIDs of request terminals, and temporary MS IDs of request terminals.

Next, the cooperation request terminal transmits data to the terminals which have transmitted the cooperation acceptance message.

Case 1 which has been described hereinabove will now be described in more detail with reference to FIG. 6.

Figure 6:
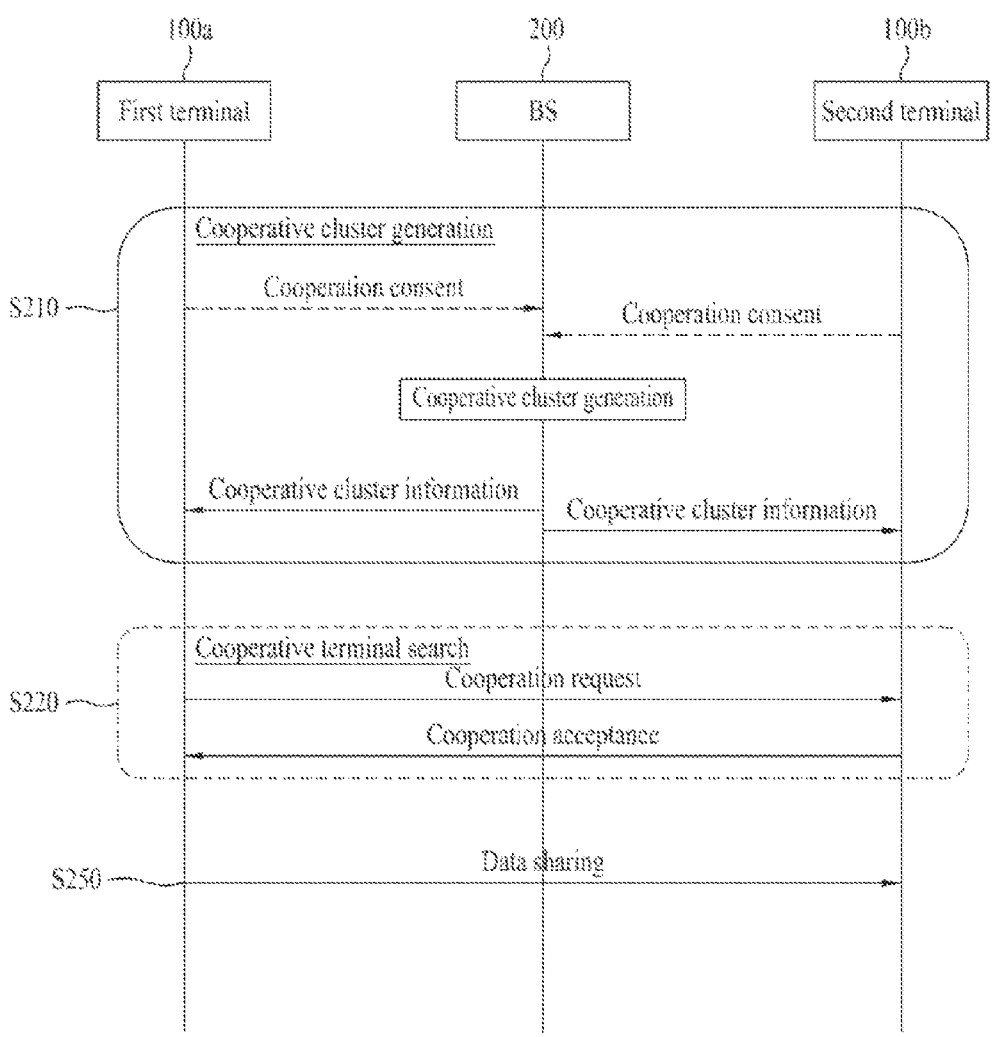
FIG. 6 exemplarily illustrates a method for transmitting information about cooperative terminal candidates to a terminal through a BS in an active mode proposed in the present invention.

FIG. 6 exemplarily illustrates a method for transmitting information about cooperative terminal candidates to a terminal through a BS in an active mode proposed in the present invention.

Referring to FIG. 6, a cooperative cluster generation process S210 searches for cooperative terminal candidates and a cooperative terminal search process S220 searches for actual cooperative terminals.

First, the cooperative cluster generation process S210 will be described. Each of a first terminal 100a and a second terminal 100b transmits a cooperation consent message (or signal or indicator) indicating consent to cooperative transmission to the BS 200. Namely, the BS 200 receives information indicating that cooperative transmission can be performed from the first and second terminals.

If the BS 200 is able to know that the two terminals 100a and 100b are cooperative terminal candidates based on subscriber information etc. of the terminals 100a and 100b, the two terminals 100a and 100b may not transmit the cooperation consent message or signal.

The BS generates a cooperative cluster including the first terminal 100a and the second terminal 100b and transmits information about the generated cooperative cluster to the two terminals 100a and 100b.

After generating the cooperative cluster, the BS 200 assigns an ID to the generated cooperative cluster and may transmit information about the cluster ID to the terminals. In addition to MSIDs (or STIDs) of the respective terminals, the BS 200 may assign temporary MS IDs which can protect information of the respective terminals and can distinguish between the terminals within each cluster and may transmit the cluster information including the temporary MS IDs to the respective terminals.

Thus, the BS 200 may transmit the cooperative cluster information including basic information for cooperative transmission such as a cooperative cluster ID and temporary MS IDs to each terminal periodically or upon occurrence of an event.

The cooperative terminal search process S220 will now be described. The first terminal 100a transmits a cooperation request message to cooperative terminal candidates belonging to the cooperative cluster based on the cooperative cluster information. The second terminal 100b transmits a cooperation acceptance message for the cooperation request message to the first terminal 100a. A terminal accepting the cooperation request may also be called a cooperation participation terminal as described above.

A resource allocation process (resource allocation request/ resource allocation) between terminals may be performed through transmission processes of the cooperation request and acceptance messages between the first and second terminals or may be separately performed after the transmission processes of the cooperation request and acceptance messages between the first and second terminals.

Namely, in the transmission processes of the cooperation request and acceptance messages between terminals, the cooperation request message may include a request for resource allocation and the cooperation acceptance message may include information about an allocated resource.

Alternatively, the transmission processes of the cooperation request and acceptance messages between terminals may be included in the resource allocation process between terminals. That is, the resource allocation request in the resource allocation process between terminals may include a cooperation request and the resource allocation information in the resource allocation process may include cooperation acceptance.

The separately performed resource allocation request process between terminals will now be described in detail. The first terminal 100a transmits a resource allocation request message for requesting cooperative transmission of data to the second terminal 100b, i.e. a cooperation participation terminal. The second terminal 100b, i.e. the cooperation participation terminal, allocates a resource to the first terminal, i.e. a cooperation request terminal, and transmits information about the allocated resource.

Next, a data sharing process S250 is performed. That is, upon receiving the resource from the second terminal 100b, the first terminal 100a shares data thereof by transmitting the data to the second terminal 100b.

Up to now, Case 1 has been described. Hereinafter, Case 2 will be described.

(2) Case 2

Case 2 is a scheme in which a terminal directly searches for (or selects) a cooperative terminal candidate.

The scheme of Case 2 is divided into 1) a self Public Relations (PR) mode I and 2) a self PR mode II, according to whether a terminal requests cooperative terminal candidates to provide cooperation or whether cooperative terminal candidates inform other terminals that they can provide cooperation.

First, the self PR mode I will be described with reference to FIG. 7.

Figure 7:
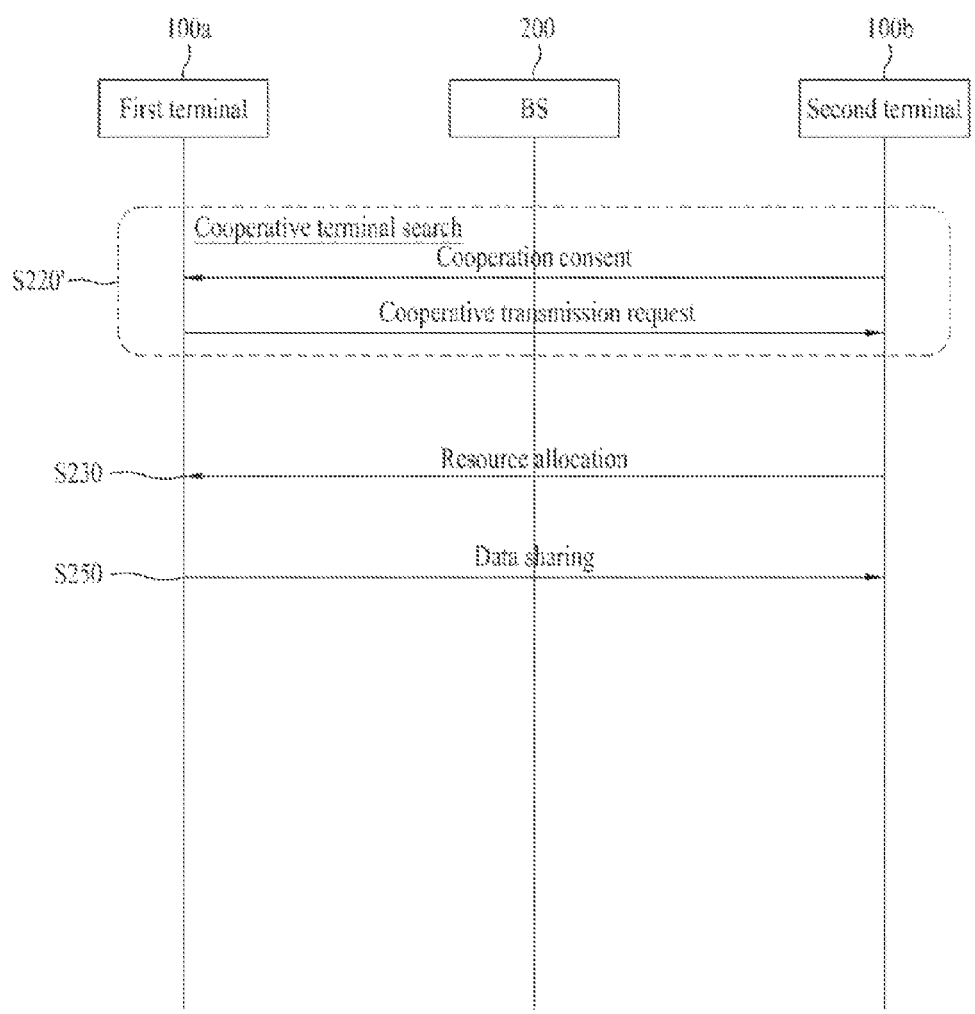
FIG. 7 exemplarily illustrates a method for searching for cooperative terminal candidates through a self PR mode I of an active mode proposed in the present invention FIG. 8 exemplarily illustrates a method for searching for cooperative terminal candidates through self PR mode II of an active mode proposed in the present invention.

FIG. 7 exemplarily illustrates a method for searching for cooperative terminal candidates through a self PR mode I of an active mode proposed in the present invention.

Referring to FIG. 7, the cooperative cluster generation process S210 of FIG. 6 is omitted and a search process S220' is provided to search for an actual cooperative terminal between two terminals.

The search process S220' will now be described in detail.

A second terminal (a terminal to participate in cooperative transmission) periodically broadcasts a cooperation consent message.

The cooperation consent message may include at least one of a 1-bit cooperation consent indicator, a part or all of MSIDs, temporary MS IDs, and cell IDs. The temporary MS ID may be a random value or sequence generated by a terminal. As a method for transmitting the cooperation consent message, an additional uplink broadcast signal may be transmitted or a part of a downlink shared signal of a BS may be used.

Upon requiring cooperative transmission, a first terminal receives the cooperation consent message from the second terminal and requests cooperative transmission. That is, the first terminal transmits a cooperation request message to the second terminal that has transmitted the cooperation consent message.

The cooperation request message may include at least one of a cooperation request indicator, all or a part of MSIDs of request terminals, all or a part of MSIDs of reception terminals, a resource allocation request message, temporary IDs of request terminals, and cell IDs. Herein, the temporary ID may be a random value or sequence generated by a terminal.

The cooperation request indicator and the cooperation acceptance indicator may be comprised of 2 bits as follows.

E.g.) 0bxx (2 bits)—MSB: Acceptance/Request, LSB: No/Yes

0b00: Cooperation non-acceptance
   0b01: Cooperation acceptance
   0b10: Cooperation request
   0b11 : Reserved Upon receipt of the cooperation request message, the second terminal transmits a resource allocation message to the first terminal that has transmitted the cooperation request message (S230).

Herein, the resource allocation message may include at least one of (all or a part of) MSIDs of cooperation request terminals, (all or a part of) MSIDs of cooperation acceptance terminals, a resource allocation location, a modulation and demodulation level, and a weight.

Next, the first terminal shares data by transmitting the data to the second terminal based on the resource allocation message received from the second terminal (S250).

Self PR mode II will now be described with reference to FIG. 8.

Figure 8:
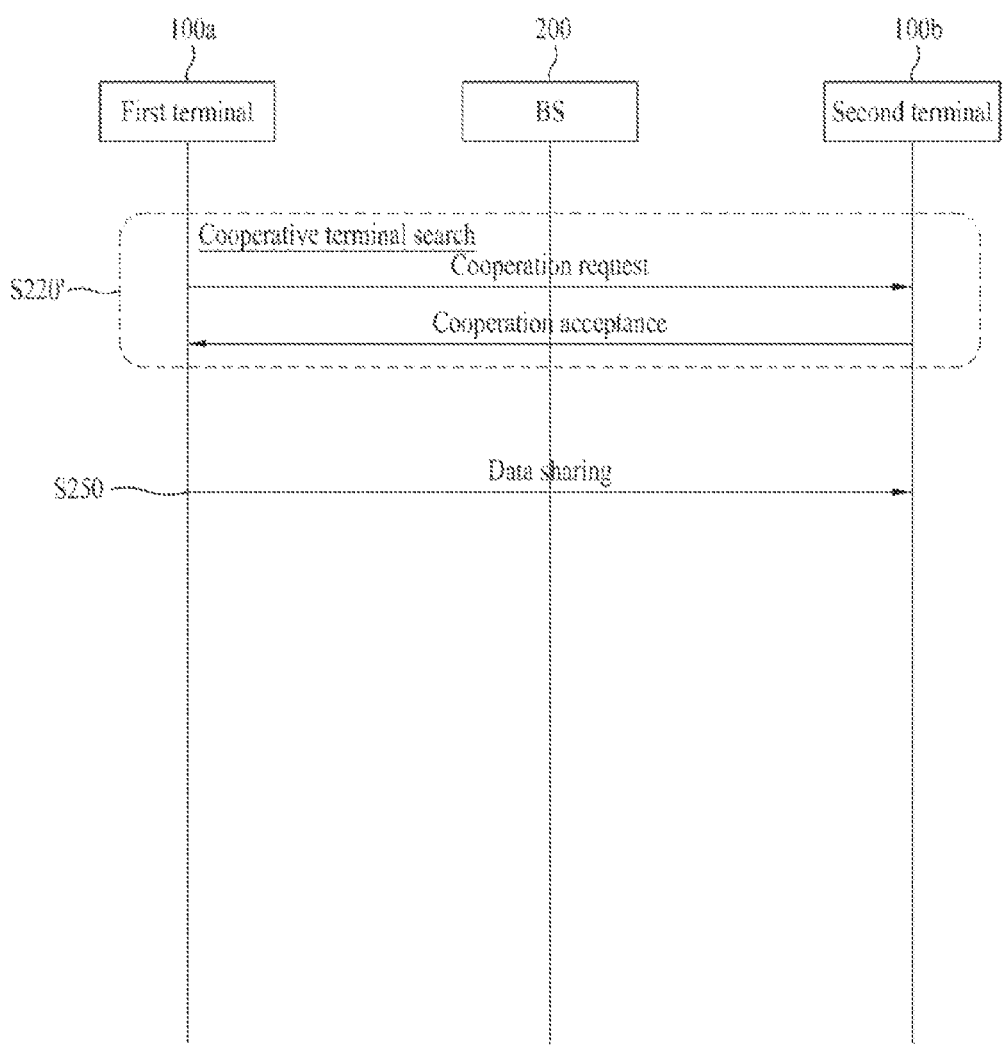

FIG. 8 exemplarily illustrates a method for searching for cooperative terminal candidates through self PR mode II of an active mode proposed in the present invention.

Referring to FIG. 8, the cooperative cluster generation process S210 of FIG. 6 is omitted and a search process S220" for searching for an actual cooperative terminal between two terminals is provided. The search process S220" of FIG. 8 is different from the search process S220' of FIG. 7 in that a first terminal requesting cooperation starts the search process first.

Specifically, in the search process S220", a first terminal broadcasts a cooperation request message when cooperative transmission is required. The cooperation request message may include at least one of (all or a part of) MSIDs of terminals, (all or a part of) flow IDs, temporary MS IDs, a cooperation request indicator, and a resource allocation request message.

The resource allocation request message may include at least one of (all or a part of) MSIDs of request terminals and (all or a part of) MSIDs of acceptance terminals.

The temporary MS ID may be a random value or sequence generated by a terminal.

As a method for transmitting the cooperation request message, an additional uplink broadcast signal may be transmitted or a part of a downlink shared signal of a BS may be used.

After receiving the cooperation request message, a second terminal which is to participate in cooperative transmission transmits a cooperation acceptance message to the first terminal in the case in which cooperative transmission can be performed.

Herein, the cooperation acceptance message may include at least one of a cooperation acceptance indicator, all or a part of MSIDs of transmission terminals, all or a part of MSIDs of cooperation request terminals, temporary MS IDs of the transmission terminals, temporary MS IDs of the cooperation request terminals, and a resource allocation message (grant) for the cooperation request terminals.

If a resource allocation message is transmitted separately from the cooperation acceptance message, the resource allocation message may include at least one of all or a part of MSIDs of transmission acceptance terminals, all or a part of MSIDs of request terminals, temporary MS IDs of transmission acceptance terminals, temporary MS IDs of request terminals, a resource allocation location, a modulation and demodulation level, and a weight.

The cooperation request indicator and the cooperation acceptance indicator may be comprised of two bits as follows.

E.g.), 0bxx (2 bits)—MSB: Acceptance/Request, LSB: No/Yes

0b00: Cooperation non-acceptance
    0b01: Cooperation acceptance
    0b10: Cooperation request
    0b11: Reserved All terminals that have received the cooperation request message may transmit a cooperation acceptance or reject message or only cooperative terminal candidates among the terminals that have received the cooperation request message may transmit the cooperation acceptance message.

Next, the first terminal shares data with the second terminal by transmitting the data to the second terminal that has transmitted the cooperation acceptance message (S250).

Up to now, the method for searching for cooperative terminal candidates has been described in the passive mode and active mode. Hereinbelow, a method for transmitting data through cooperation between terminals will be described with reference to FIG. 9 to FIG. 12.

Figure 9:
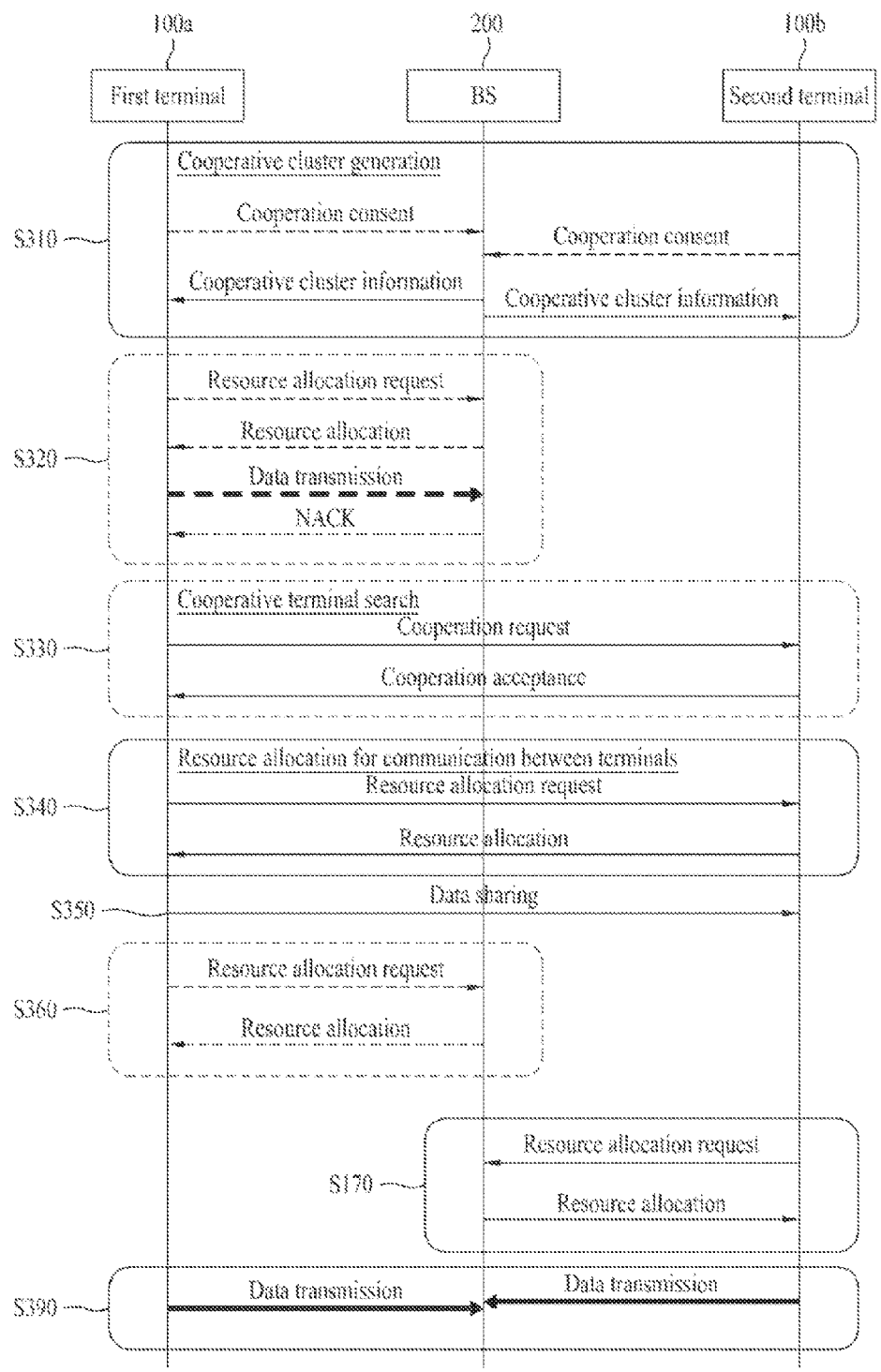
FIG. 9 exemplarily illustrates a method for transmitting data through cooperation between terminals.

FIG. 9 exemplarily illustrates a method for transmitting data through cooperation between terminals.

Referring to FIG. 9, a BS 200 generates a cooperative cluster and informs a first terminal 100a and a second terminal 100b of information about the cooperative cluster. In FIG. 9, determination as to whether the first terminal 100a and the second terminal 100b belonging to the cooperative cluster are to actually transmit data through cooperation is performed through a cooperative terminal search process S330. In the cooperative terminal search process S330 of FIG. 9, the first terminal 100a is a cooperation request terminal that makes a request for cooperation and the second terminal 100b is a cooperative transmission terminal that transmits data in response to the cooperation request. This will now be described in detail.

In a cooperative cluster generation process S310, each of the first terminal 100a and the second terminal 100b may transmit a cooperation consent message (or signal or indicator) indicating that cooperative transmission can be performed to the BS 200. If the BS 200 is able to know that the two terminals 100a and 100b are cooperative terminal candidates based on, for example, cooperative cluster information (cluster ID, etc.) or MSIDs, the two terminals 100a and 100b may not transmit the cooperation consent message or signal.

The BS 200 generates a cooperative cluster including the first terminal 100a and the second terminal 100b and transmits information about the generated cooperative cluster to the two terminals 100a and 100b. As described previously, the BS 200 may generate the cooperative cluster including the first terminal 100a and the second terminal 100b using subscriber information of the terminals or information such as a CQI or SINR received from the terminals even when the cooperation consent message (or signal or indicator) is not received.

After generating the cooperative cluster, the BS 200 assigns an ID to the generated cooperative cluster and may transmit cluster ID information to the terminals. Separately from an MSID (or STID) of each terminal, the BS 200 may assign temporary MS IDs which can protect information of each terminal and can distinguish between terminals within each cluster and may transmit the cooperative cluster information including the temporary MS IDs to the terminals.

Thus, the BS 200 may transmit the cooperative cluster information including basic information for cooperative transmission such as an ID of a cooperative transmission cluster and temporary MS IDs to each terminal periodically or upon occurrence of an event.

Next, the first terminal 100a performs an initial data transmission process S320. More specifically, the first terminal 100a transmits a resource allocation request message or signal to the BS 200. Upon a resource being allocated from the BS 200, the first terminal 100a transmits data to the BS 200. The BS 200 may transmit a negative response (e.g. a NACK signal or message) to data transmission.

If the initial data transmission process S320 fails, a cooperative terminal search process S330 may be performed. Alternatively, the cooperative terminal search process S330 may be performed without performing the initial data transmission process S320.

When it is determined that a channel state is not good, the cooperative terminal search process S330 may be performed without performing the initial data transmission process S320.

The cooperative terminal search process S330 will now be described. The first terminal 100a transmits a cooperation request message to cooperative terminal candidates belonging to the cooperative cluster based on the cooperative cluster information. In FIG. 9, the second terminal 100b transmits a cooperation acceptance message for the cooperation request message to the first terminal 100a. A terminal accepting the cooperation request may also be called a cooperation participation terminal as described above.

In FIG. 9, although the first terminal 100a is illustrated as transmitting the cooperation request message to cooperative terminal candidates belonging to the cooperative cluster, the first terminal 100a may transmit the cooperation request message to the BS 200. Then the BS 200 may transmit the cooperation request message to the cooperative terminal candidates belonging to the cooperative cluster.

Next, a resource allocation process S340 between terminals may be performed. Specifically, the first terminal 100a transmits a resource allocation request message to request cooperative transmission of data to the second terminal 100b, i.e. a cooperation participation terminal. The second terminal 100b, i.e. a cooperation participation terminal, allocates a resource to the first terminal, i.e. a cooperation request terminal, and transmits information about the allocated resource.

The cooperative terminal search process S330 and the resource allocation process S340 between terminals may be integrated into one process.

For example, the resource allocation process S340 between terminals may be included in the cooperative terminal search process S330. That is, the cooperation request message in the cooperative terminal search process S330 may include a resource allocation request and the cooperation acceptance message in the cooperative terminal search process S330 may include information about the allocated resource. Alternatively, the cooperative terminal search process S340 may be included in the resource allocation process S340 between terminals. Namely, in the resource allocation process S340 between terminals, the resource allocation request message may include a cooperation request and the resource allocation message may include cooperation acceptance.

Next, a data sharing process S350 is performed. Upon the resource being allocated from the second terminal 100b, the first terminal 100a shares data thereof with the second terminal 100b by transmitting the data to the second terminal 100b.

Thereafter, a resource allocation process S360 or S370 from the BS is performed. Specifically, the BS 200 allocates an uplink resource to one or more of the first terminal 100a and the second terminal 100b (S360 and S370). If the first terminal 100a has been resource-allocated through the initial data transmission process S320, the resource allocation process S360 of the first terminal 100a may be omitted.

Thereafter, a cooperative transmission process S390 may be performed. In the cooperative transmission procedure S390, both the first terminal 100a and the second terminal 100b may transmit data to the BS 200 as shown in FIG. 9 or only the second terminal 100b may transmit data of the first terminal 100a to the BS 200.

Modified Examples of Each Process And Examples of Information Transmitted and Received in Each Process Shown in FIG. 9

Flow of each process has been described hereinabove. Hereinafter, modified examples of each process and examples of information transmitted and received in each process will be mainly described.

The modified examples may include a modified example where the initial data transmission process S320 is performed, a modified example where the initial data transmission process S320 is not performed, and a modified example commonly applicable to both of the above modified examples.

First, the modified example where the initial data transmission process S320 is performed is as follows.

The initial data transmission process S320 and the cooperative terminal search process S330 may be integrated into one process. For example, the resource allocation request message in the initial data transmission process S320 may include the cooperation request message or indicator.

The cooperation request message or indicator includes at least one of the following information:

A cooperation request indicator, and

ID information of a cooperation request terminal which may include an MSID (or STID) of the cooperation request terminal and a temporary ID of the cooperation request terminal.

Meanwhile, if the first terminal 100a receives the resource allocation message from the BS 200 through the first initial transmission process S302, the BS 200 may previously allocate an uplink resource for cooperative transmission to one or more of the first terminal 100a and the second terminal 100b. The BS 200 may transmit an uplink resource message including information about the uplink resource allocated for cooperative transmission to the first terminal 100a when transmitting the resource allocation message in the initial data transmission process S320 or separately from transmission of the resource allocation message. The BS 200 may transmit the uplink resource message to the second terminal 100b through an additional message.

In this way, if the uplink resource for cooperative transmission is previously allocated, the resource allocation process S360 by the first terminal 100a and the resource allocation process S370 by the second terminal 100b may not be performed.

The uplink resource allocation message including information about the uplink resource allocated for cooperative transmission by the BS 200 to any one of the first terminal 100a and the second terminal 100b may include at least one of the following information:

A cooperative cluster ID,

ID information of a cooperation request terminal which may include one or more of an MSID (or STID) of the cooperation request terminal and a temporary ID of the cooperation request terminal, BS uplink resource allocation information for the cooperation request terminal, which may include at least one of allocation size, allocation location, Modulation and Coding Scheme (MCS), and MIMO information (e.g. MIMO scheme, PMI, rank indicator etc.), ID information of a cooperative transmission terminal which may include either an MSID (or STID) of the cooperative transmission terminal and a temporary ID of the cooperative transmission terminal, and BS uplink resource allocation information for the cooperative transmission terminal, which may include at least one of allocation size, allocation location, MCS, and MIMO information (MIMO scheme, PMI, rank indicator, etc.).

A CRC of the resource allocation message may be masked with one of an MSID (or STID) of a terminal, a temporary ID of a terminal, and a cooperative cluster ID. To easily support RF combining in a BS, the CRC of the uplink resource allocation message is desirably masked with common information for terminals that are engaged in cooperative transmission. The common information may be one of the following information:

A cooperative cluster ID of terminals,

A combination of all or a part of temporary IDs of terminals, wherein the combination may be i) concatenation for all or a part of temporary IDs of terminals that are engaged in cooperative transmission or ii) permutation for all or a part of temporary IDs of terminals that are engaged in cooperative transmission, A combination of all or a part of MSIDs or STIDs of terminals, wherein the combination may be i) concatenation for all or a part of MSIDs (or STIDs) of terminals that are engaged in cooperative transmission or ii) permutation for all or a part of MSIDs (STIDs) of terminals that are engaged in cooperative transmission, A temporary ID of a cooperation request terminal, and An MSID (or STID) of the cooperation request terminal.

Meanwhile, the initial data transmission process S320 and the resource allocation process S340 between terminals may be integrated into one process. For example, if the first terminal 100a transmits the resource allocation request message in process S320 to the BS 200, the BS 200 may transmit the resource allocation request message between terminals in process S340 to cooperative terminal candidates belonging to the cooperative cluster, e.g. the second terminal 100b on behalf of the first terminal 100a. In this case, the cooperative terminal candidate, i.e. the second terminal 100b may transmit the resource allocation message between terminals in process S340 to the BS 200 and the BS 200 may transmit the received resource allocation message to the first terminal 100a.

The resource allocation message transmitted from the BS 200 to the first terminal 100a may include at least one of the following information:

A cooperative cluster ID,

ID information of a cooperation request terminal which may include one or more of an MSID (or STID) of the cooperation request terminal and a temporary ID of the cooperation request terminal, ID information of a cooperative transmission terminal which may include one or more of an MSID (or STID) of the cooperative transmission terminal and a temporary ID of the cooperative transmission terminal, and Resource allocation information for communication between terminals which may include one or more of allocation size, allocation location, MCS, MIMO information (MIMO scheme, PMI, rank indicator, etc.), transmit power information (a transmit power, power ratio, etc.), and ACK/NACK transmission location.

If all terminals that are engaged in cooperative transmission refer to the resource allocation message, a process may be simplified. For example, the CRC of the resource allocation message for communication between terminals may be masked with common information for the above-mentioned terminals. If an additional resource allocation message is transmitted to a specific cooperative transmission terminal, the corresponding resource allocation message may be identified using an ID of the corresponding terminal. In this case, there is a disadvantage that the cooperative transmission terminal should again transmit the resource allocation message to a cooperation request terminal.

Second, modified examples where the initial data transmission process S320 is not performed are as follows.

As described above, the cooperative terminal search process S330 and the resource allocation process S340 between terminals may be integrated into one process.

As a modified example of the resource allocation process S340 between terminals, the first terminal 100a, which is a cooperation request terminal, transmits information of a requested resource to the second terminal 100b, which is a cooperative terminal candidate. Namely, a location, size, and a transmission scheme desired by the cooperation request terminal, i.e. the first terminal 100a, are predetermined and the first terminal 100a informs the cooperative terminal candidate, i.e. the second terminal 100b, of the location, size, and transmission scheme.

Last, a modified example which is commonly applicable irrespective of whether the initial data transmission process S320 is performed will now be described.

In step S330, the BS 200 may transmit the cooperation request message to the second terminal 100b on behalf of the first terminal 100a as described in the previous modified example.

The cooperation request message transmitted by the BS 200 on behalf of the first terminal 100a includes at least one of the following information so that the second terminal 100b can receive a subsequent message (e.g. resource allocation request message or data of the first terminal 100a) or transmit, for example, the resource allocation message:

A cooperation request indicator,
ID information of a cooperation request terminal which may include one or more of an MSID (or STID) of the cooperation request terminal and a temporary ID of the cooperation request terminal, and
A cooperative cluster ID of the cooperation request terminal.

The resource allocation request message transmitted by the first terminal 100a in the resource allocation process S340 between terminals may include at least one of the following information:

A cooperation request indicator,
ID information of a cooperative transmission terminal which may include one or more of an MSID (or STID) of the cooperative transmission terminal and a temporary ID of the cooperative transmission terminal,
Resource allocation request information for communication between terminals which may include the size of transmission data size, QoS of the transmission data, and data type (e.g. FID), and
Resource allocation information for communication between terminals which may include one or more of transmission data size, transmission data location, a data transmission scheme (MIMO scheme, PMI, MCS, etc.), data transmit power (transmit power, power headroom, etc.), and ACK/NACK transmission location.

The resource allocation message transmitted by the cooperative terminal candidate may include at least one of the following information:

A cooperation acceptance indicator
ID information of a cooperative transmission terminal which may include one or more of an MSID (or STID) of the cooperative transmission terminal and a temporary ID of the cooperative transmission terminal, and
Resource allocation information which may include one or more of allocation size, allocation location, MCS, MIMO information (MIMO scheme, PMI, rank indicator, etc.), transmit power information (transmit power, power ratio, etc.), and ACK/NACK transmission location.

Since the resource allocation request message and the resource allocation message may jeopardize information security, it is desirable to detect the messages through a temporary ID of a terminal. Namely, the CRC of a corresponding message may be masked with the temporary ID of a cooperation request terminal.

The BS 200 may perform a procedure for causing the cooperative terminal candidate to prepare for cooperation before performing processes S330 and S340. To this end, the BS 200 may transmit a positive traffic indicator etc. to the second terminal 100b so that the second terminal 100b awakes from a sleep mode, or may transmit a paging message so that the second terminal 100b escapes from an idle mode.

Figure 10:
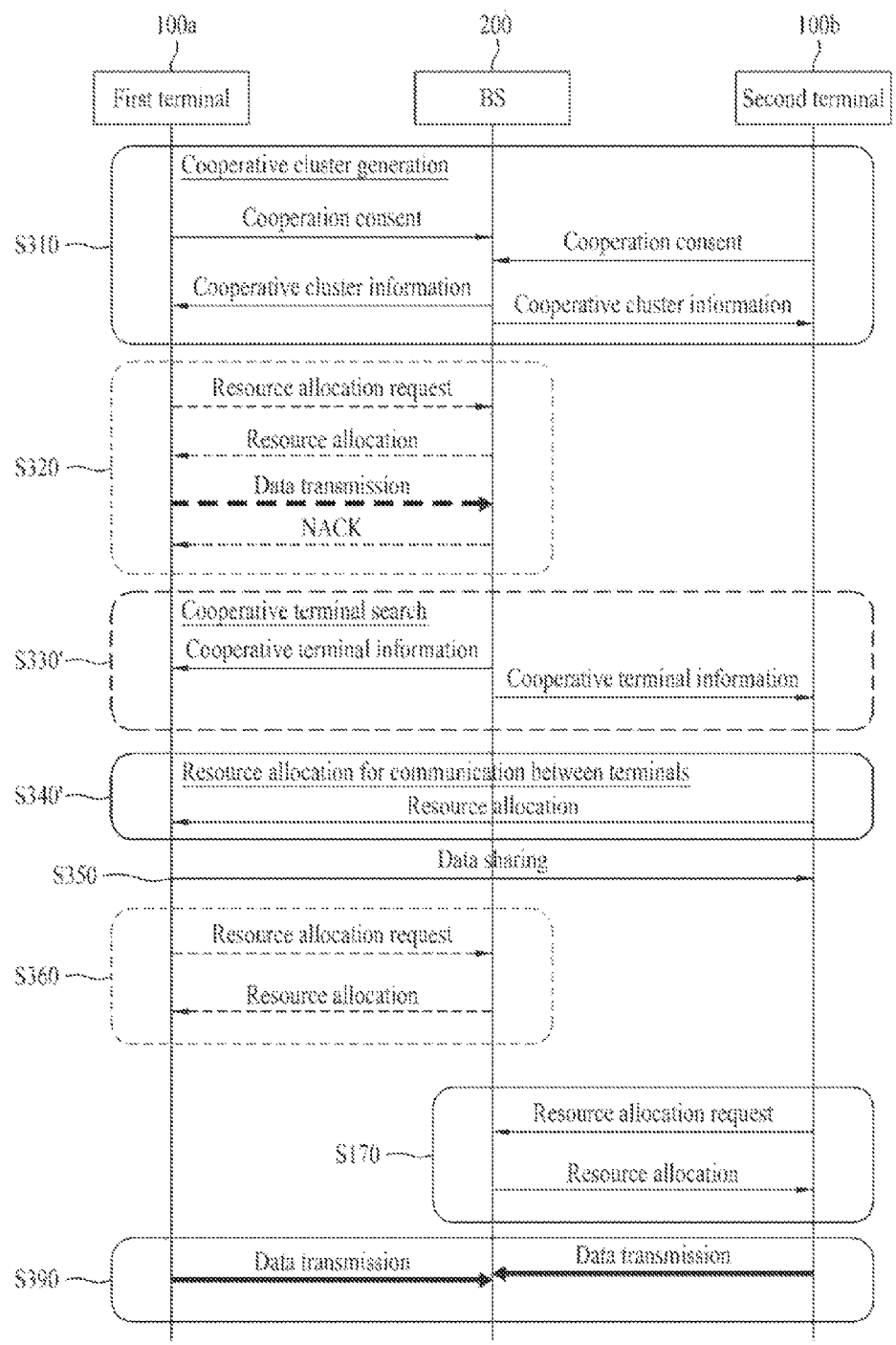
FIG. 10 exemplarily illustrates a modified example of the method shown in FIG. 9.

FIG. 10 exemplarily illustrates a modified example of the method shown in FIG. 9.

Referring to FIG. 10, the BS 200 generates a cooperative cluster as in FIG. 9 and informs the first terminal 100a and the second terminal 100b of information about the cooperative cluster.

Nonetheless, a cooperative terminal search process S330' and a resource allocation process S340' of FIG. 10 are modified from the corresponding processes of FIG. 9.

Hereinafter, a description will be mainly given of different parts from the processes of FIG. 9 and description of the same parts will be incorporated by reference without repetitive description.

In the modified cooperative terminal search process S330', the BS 200 determines cooperative terminals even without receiving a cooperation request and transmits information about the cooperative terminals to the determined cooperative terminals. In addition, according to the modified resource allocation process between terminals, the second terminal 100b may transmit the resource allocation message to the first terminal 100a even without receiving the resource allocation request. At this time, the second terminal 100b may transmit the resource allocation message to the BS 200 and the BS 200 may transmit the resource allocation message to the first terminal 100a.

Each process shown in FIG. 10 except for the above description is similar to that shown in FIG. 9 and reference may be made to FIG. 9.

Modified Examples of Each Process and Examples of Information Transmitted and Received in Each Process Shown in FIG. 10

Hereinafter, modified examples of each process and examples of information transmitted and received in each process will be mainly described.

The modified examples may include a modified example where the initial data transmission process S320 is performed, a modified example where the initial data transmission process S320 is not performed, and a modified example commonly applicable to both of the above modified examples.

First, the modified example where the initial data transmission process S320 is performed is as follows.

The initial data transmission process S320 and the cooperative terminal search process S330' may be integrated into one process. For example, the resource allocation message of the initial data transmission process S320 may include information about cooperative terminals determined by the BS 200 in process S330', for example, cooperative terminal information.

Meanwhile, if the first terminal 100a receives the resource allocation message from the BS 200 through the initial data transmission process S320, the BS 200 may previously allocate an uplink resource for cooperative transmission to one or more of the first terminal 100a and the second terminal 100b. The BS 200 may transmit an uplink resource message including information about the uplink resource allocated for cooperative transmission to the first terminal 100a when transmitting the resource allocation message in the initial data transmission process S320 or separately from transmission of the resource allocation message. The BS 200 may transmit the uplink resource message to the second terminal 100b through an additional message.

In this way, if the uplink resource for cooperative transmission is previously allocated, the resource allocation process S360 by the first terminal 100a and the resource allocation process S370 by the second terminal 100b need not be performed.

The resource allocation message for cooperative transmission may include the following information:

A grant type indicator for cooperative transmission, indicating that the corresponding resource allocation message is a resource allocation message for uplink transmission through cooperative transmission between terminals, A cooperative cluster ID, ID information of a cooperation request terminal which may include an MSID (or STID) of the cooperation request terminal and a temporary ID of the cooperation request terminal, Uplink resource allocation information of a BS for the cooperation request terminal which may include at least one of allocation size, allocation location, MCS, and MIMO information (e.g. MIMO scheme, PMI, rank indicator etc.), and ID information of a cooperative transmission terminal which may include one or more of an MSID (or STID) of the cooperative transmission terminal and a temporary ID of the cooperative transmission terminal.

When the BS 200 transmits the uplink resource allocation information to the first terminal 100a, uplink resource allocation information of the second terminal 100b may be transmitted as well. In this case, the uplink resource allocation information transmitted to the first terminal 100a may include the following information:

Uplink resource allocation information for a cooperative transmission terminal (e.g. the second terminal), which may include one or more of allocation size, allocation location, MCS, and MIMO information (MIMO scheme, PMI, rank indicator, etc.).

Thus, the uplink resource allocation information may be transmitted only to the first terminal 100a or may be transmitted to both the first terminal 100a and the second terminal 100b. If the uplink resource allocation information is transmitted to both the first terminal 100a and the second terminal 100b, the uplink resource allocation information transmitted to the first terminal 100a and the uplink resource allocation information transmitted to the second terminal 100b may be the same or different.

On the other hand, the initial data transmission process S320 and the resource allocation process S340' between terminals may be integrated into one process. For example, if the first terminal 100a transmits the resource allocation request message in process S320 to the BS 200, the BS 200 may transmit the resource allocation request message between terminals in process S340 to cooperative terminal candidates belonging to the cooperative cluster, e.g. the second terminal 100b, on behalf of the first terminal 100a. To this end, the BS 200 may discern link information between terminals. Then, the cooperative terminal candidate, i.e. the second terminal 100b, may transmit the resource allocation message between terminals in process S340' to the BS 200 and the BS 200 may transmit the received resource allocation message to the first terminal 100a.

The resource allocation message for a resource between terminals, transmitted from the BS 200 to the first terminal 100a, may include at least one of the following information, wherein a restricted modulation and coding level should be applied to communication between terminals:

Uplink resource allocation information of a cooperation request terminal for a cooperative transmission terminal (resource allocation information for communication between terminals), which may include one or more of allocation size, allocation location, MCS, MIMO information (MIMO scheme, PMI, rank indicator, etc.), and transmit power information (transmit power, power ratio, etc.).

Meanwhile, the cooperative terminal search process S330' and the resource allocation process S340' between terminals may be integrated into one process.

For example, the cooperative terminal information transmitted from the BS 200 to the cooperation request terminal, i.e. the first terminal 100a, in the terminal search process S330' may include the following information:

A grant type indicator for cooperative transmission, which may be an indicator representing resource allocation information transmitted from the BS to the cooperation request terminal or representing resource information allocated by a cooperative transmission terminal to the cooperation request terminal with respect to communication between terminals received by the cooperative transmission terminal, wherein the cooperation request terminal may transmit data to the cooperative transmission terminal through a corresponding resource area, A cooperative cluster ID, An MSID (or STID) of the cooperation request terminal, A temporary ID of the cooperation request terminal, and Resource allocation information for communication between terminals, indicating resource allocation information transmitted from the cooperative transmission terminal to the cooperation request terminal.

The CRC of the corresponding resource allocation information may be masked with one of an MSID (or STID) of the cooperation request terminal, a temporary ID of the cooperation request terminal, and a cooperative cluster ID.

As an another example, the cooperative terminal information transmitted from the BS 200 to the cooperative transmission terminal, i.e. the second terminal 100b, in the terminal search process S330' may include the following information:

A grant type indicator for cooperative transmission, which may represent resource allocation information transmitted from the BS to the cooperative transmission terminal or resource information allocated to the cooperation request terminal by the cooperative transmission terminal with respect to communication between terminals received by the cooperative transmission terminal, wherein the cooperative transmission terminal performs communication with the cooperative transmission terminal through a corresponding resource, A cooperative cluster ID, ID information of the cooperation request terminal which may include an MSID (or STID) of the cooperation request terminal or a temporary ID of the cooperation request terminal, ID information of the cooperative transmission terminal which may include an MSID (or STID) of the cooperative transmission terminal or a temporary ID of the cooperative transmission terminal, Uplink resource allocation information indicating resource allocation information for the cooperative transmission terminal, which may include one or more of allocation size, allocation location, MCS, MIMO information (MIMO scheme, PMI, rank indicator, etc.), and transmit power information (transmit power, power ratio, etc.), and Resource allocation information for communication between terminals, which indicates resource allocation information transmitted from the cooperative transmission terminal to the cooperation request terminal and may include allocation size, allocation location, MCS, MIMO information (MIMO scheme, PMI, rank indicator, etc.), transmit power information (transmit power, power ratio, etc.), and ACK/NACK transmission location.

The CRC of the corresponding resource allocation information may be masked with one of an MSID (or STID) of the cooperative transmission terminal, a temporary ID of the cooperative transmission terminal, and a cooperative cluster ID.

Meanwhile, as a modified example, the resource allocation information for communication between terminals transmitted by the BS 200 may include only allocation size and/or location. In this case, terminals which are engaged in cooperative transmission determine detailed resource allocation information and control information necessary for data transmission while exchanging control information with each other.

As a still another modified example, resource allocation information for communication between terminals transmitted by the BS 200 provides all resource allocation information necessary for data transmission. In this case, the cooperation request terminal transmits data according to information received from the BS and the cooperative transmission terminal receives data according to information determined by the BS.

Figure 11:
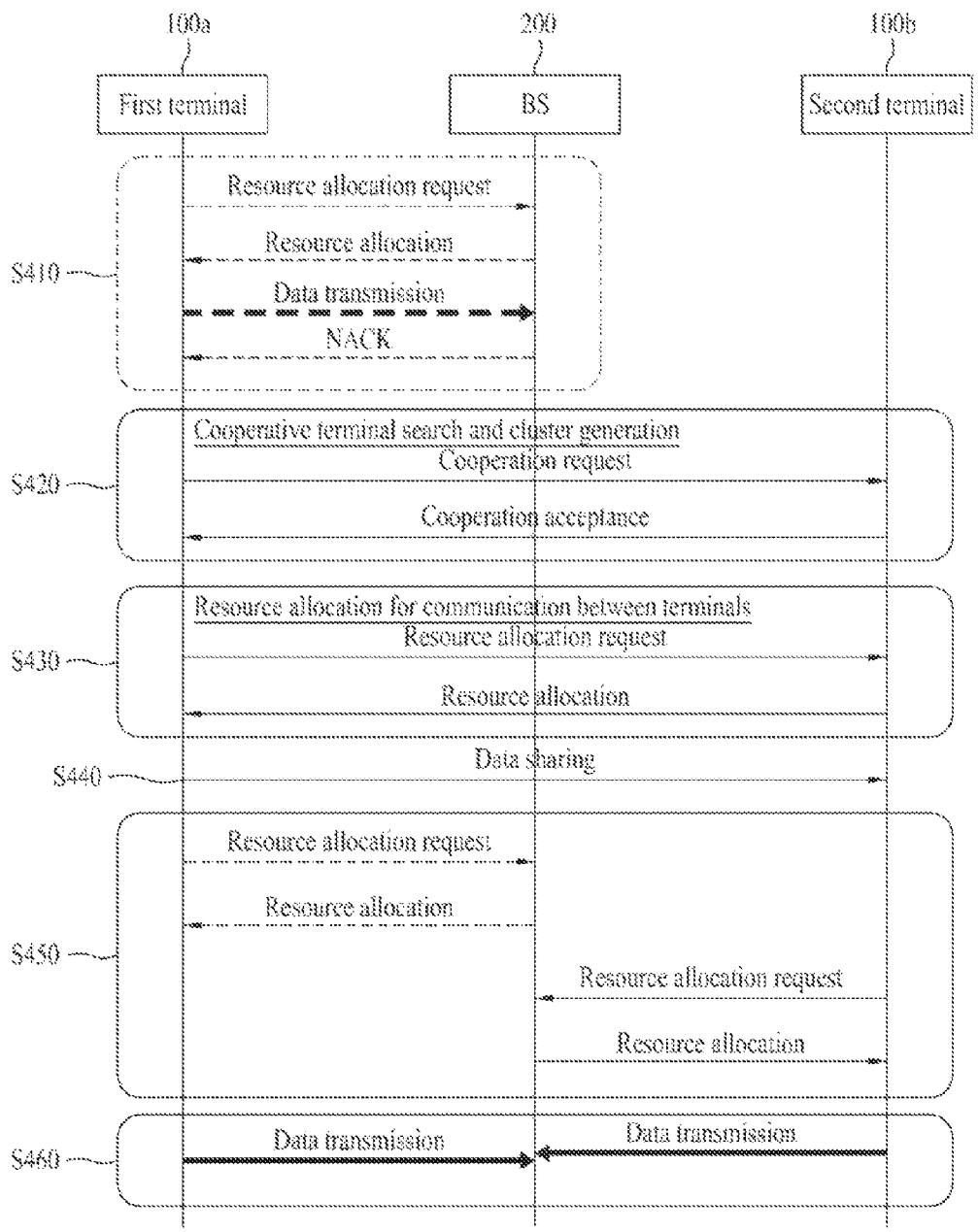
FIG. 11 exemplarily illustrates another method for transmitting data through cooperation between terminals.

FIG. 11 exemplarily illustrates another method for transmitting data through cooperation between terminals.

Processes shown in FIG. 11 are similar to the processes shown in FIG. 9 and FIG. 10. In FIG. 11, a cooperative cluster is generated through a cooperative terminal search process between terminals unlike FIG. 9. Hereinafter, a description will be mainly given of different parts from the processes of FIG. 9 or FIG. 10 and description of similar parts will be incorporated by reference without repetitive description.

The first terminal 100*a* performs an initial data transmission process S410. Specifically, the first terminal 100*a* transmits a resource allocation request message or signal to the BS 200. Upon a resource being allocated from the BS 200, the first terminal 100*a* transmits data to the BS 200. The BS 200 may transmit a negative response (e.g. a NACK signal or message) to data transmission.

Thus, if the initial data transmission process S410 fails, a cooperative terminal search and cluster generation process S420 may be performed. Alternatively, the cooperative terminal search and cluster generation process S420 may be performed without performing the initial data transmission process S410.

When it is determined that a channel state is not good, the cooperative terminal search and cluster generation process S420 may be performed without performing the initial data transmission process S410.

The cooperative terminal search and cluster generation process S420 will now be described. The first terminal 100*a* and the second terminal 100*b* generate a cooperative cluster (S420) when the initial data transmission process S410 fails or without performing the initial data transmission process S410. Specifically, when the cooperative cluster is generated, if the first terminal 100*a* requests the second terminal 100*b* to provide cooperation and the second terminal 100*b* accepts the cooperation request, the first terminal 100*a* and the second terminal 100*b* are grouped to the cooperative cluster by each other.

A cooperation request terminal, e.g. the first terminal 100*a*, may generate and allocate a cooperative cluster ID while requesting another terminal to provide cooperation. A cooperative transmission candidate, e.g. the second terminal 100*b*, may generate and allocate a cooperative cluster ID while accepting cooperation. The first terminal 100*a* or the second terminal 100*b* may generate and allocate a unique temporary ID which can distinguish between terminals in a corresponding cooperative cluster.

Next, a resource allocation process S430 for communication between terminals is performed. This process is similar to process S340 of FIG. 9 and thus repetitive description will not be given. Meanwhile, the cooperative terminal search and cluster generation process S420 and the resource allocation process S430 for communication between terminals may be integrated into one process. This will be readily understood by those skilled in the art by referring to the description of FIG. 9 and FIG. 10 and, therefore, additional description will not be given.

Thereafter, a data sharing process S440 is performed. Since this process is similar to process S350 of FIG. 9, repetitive description will be omitted.

Next, a resource allocation process S450 for the first terminal 100*a* and a resource allocation process S460 for the second terminal 100*b* are performed. Processes S450 and S460 are similar to processes S360 and S370 of FIG. 9 respectively and, therefore, detailed description thereof will be omitted.

For description of these processes, reference may be made to the above description and additional description will not be given. It should be noted that a resource allocation request of the second terminal 100*b* in process S450 may be omitted. That is, if the second terminal 100*b* uses an uplink resource allocated to the first terminal 100*a*, an additional uplink resource may not be allocated to the second terminal 100*b*.

Modified Examples of Each Process and Examples of Information Transmitted and Received in Each Process Shown in FIG. 11

Flow of each process has been described hereinabove. Hereinafter, modified examples of each process and examples of information transmitted and received in each process will be mainly described.

In process S420, a cooperation request message transmitted from the first terminal 100*a* to the second terminal 100*b*

(i.e. a cooperation request terminal→a cooperative terminal candidate) may include at least one of the following information:

- A cooperation request indicator indicating a indicator transmitted from the first terminal to the second terminal,
- ID information of the cooperation request terminal (e.g. the first terminal) which may include an MSID (or STID) of the cooperation request terminal and a temporary ID of the cooperation request terminal,
- A cooperative cluster ID of the cooperation request terminal,
- Channel information for a BS uplink of the cooperation request terminal, which may include a CQI for the BS uplink and a receive SINR for the BS uplink (or downlink), and
- Resource allocation request information of the cooperation request terminal which includes at least one of data information to be transmitted by a terminal (original information size, QoS, etc.) and uplink resource allocation information received from a BS (e.g. resource location, allocation size, modulation and coding level, MIMO scheme, PMI, etc. or grant information size, QoS, etc.).

Meanwhile, processes S420 and S430 may be integrated into one process as described above.

First, the cooperation request message of process S420 may include a resource allocation request message of process S430. Unlike this, even though processes S420 and S430 are integrated, the first terminal may separately transmit the cooperation request message and the resource allocation request message.

In this case, the cooperation request message of the first terminal 100a includes at least one of the following information. Namely, the cooperation request terminal, i.e. the first terminal 100a, may request cooperative transmission including resource allocation request information:

- A cooperation request indicator which may be an indicator indicating a cooperation request transmitted from a terminal to another terminal or an indicator indicating a cooperation request and a resource allocation request transmitted from a terminal to another terminal,
- ID information of the cooperation request terminal which may include an MSID (or STID) of the cooperation request terminal and a temporary ID of the cooperation request terminal,
- A cooperative cluster ID of the cooperation request terminal,
- Channel information for a BS uplink of the cooperation request terminal, which may include a CQI for the BS uplink and a receive SINR for the BS uplink (or downlink), and
- Resource allocation request information of the cooperation request terminal which may include data information to be transmitted by the terminal (original information size, QoS, etc.).

Meanwhile, if processes S420 and S430 are integrated into one process, a cooperation acceptance message of a cooperative terminal candidate, i.e. the second terminal 100b, in process S420 may include resource allocation information. The cooperation acceptance message includes at least one of the following information:

- A cooperation acceptance (confirmation) indicator which may indicate a cooperative transmission message transmitted from the cooperative transmission terminal to the cooperation request terminal or a resource allocation message transmitted from the cooperative transmission terminal to the cooperation request terminal,
- An ID of the cooperative transmission terminal which may include an MSID (or STID) of the cooperative transmission terminal, a temporary ID of the cooperative transmission terminal, and a cooperative cluster ID of the cooperative transmission terminal (which is the same as a cooperative cluster ID of the cooperation request terminal),
- An ID of the cooperation request terminal which may include an MSID (or STID) of the cooperation request terminal, a temporary ID of the cooperation request terminal, and a cooperative cluster ID of the cooperation request terminal, and
- Resource allocation information for the cooperation request terminal which may include resource allocation information (resource size, resource location, MCS, etc.), information about transmission type (e.g. MIMO scheme, PMI, rank indicator, etc.), and information about ACK/NACK transmission location.

Meanwhile, if processes S420 and S430 are integrated into one process, the cooperation request message transmitted from the first terminal 100a to the cooperative terminal candidate may include resource allocation information. Namely, location, size, and a transmission scheme desired by the cooperation request terminal are predetermined and the first terminal 100a informs the cooperative terminal candidate of the location, size, and transmission scheme. In this case, the above resource allocation request information includes at least of the following information:

- Resource allocation information of the cooperation request terminal which may include one or more of transmission data size, transmission data location, data transmission scheme (MIMO scheme, PMI, MCS, etc.), data transmit power (transmit power, power headroom etc.), and ACK/NACK transmission location.

Meanwhile, if processes S420 and S430 are integrated into one process, the cooperation request message may be included in the resource allocation request message of the process S430. In this case, the resource allocation request message includes at least one of the following information:

- A cooperation request indicator which may be an indicator indicating a resource allocation request between terminals transmitted from a terminal to another terminal,
- ID information of the cooperation request terminal which may include an MSID (or STID) of the cooperation request terminal and a temporary ID of the cooperation request terminal,
- A cooperative cluster ID of the cooperation request terminal,
- ID information of the cooperative transmission terminal which may include an MSID (or STID) of the cooperative transmission terminal or a temporary ID of the cooperative transmission terminal,
- Channel information for a BS uplink of the cooperation request terminal, which may include a CQI for the BS uplink or a receive SINR for the BS uplink (or downlink), and
- Resource allocation request information of the cooperation request terminal which may include data information to be transmitted by a terminal (original information size, QoS, etc.), and uplink resource allocation information received from a BS (e.g. resource location, allocation size, modulation and coding level, MIMO scheme, PMI etc. or grant information size, QoS, etc.).

Meanwhile, as a modified example of process S430, the first terminal 100a, which is the cooperation request terminal, may transmit information about a requested resource to the second terminal 100b, which is a cooperative terminal candidate. Namely, location, size, and a transmission scheme desired by the cooperation request terminal, i.e. the first terminal 100a, are predetermined and the first terminal 100a informs the cooperative terminal candidate, i.e. the second terminal 100b, of the location, size, and transmission scheme. The information about the requested resource may include the following information:

Resource allocation information of the cooperation request terminal which may include one or more of transmission data size, transmission data location, a data transmission scheme (MIMO scheme, PMI, MCS, etc.), data transmit power (transmit power, power headroom etc.), and ACK/NACK transmission location.

The resource request information may include a cooperation request of the second terminal.

The CRC of a message including such information may be masked with one of an MSID (or STID) of the cooperation request terminal, a temporary ID of the cooperation request terminal, and a cooperative cluster ID.

In process S430, the resource allocation message of the cooperative terminal candidate, i.e. the second terminal 100b (cooperative terminal candidate→cooperation request terminal) may include at least one of the following information:

A cooperation acceptance (confirmation) indicator which may indicate a resource allocation message transmitted from the cooperative transmission terminal to the cooperation request terminal, An ID of the cooperative transmission terminal which may include an MSID (or STID) of the cooperative transmission terminal, a temporary ID of the cooperative transmission terminal, or a cooperative cluster ID of the cooperative transmission terminal (which is the same as a cooperative cluster ID of the cooperation request terminal), An ID of the cooperation request terminal which may include an MSID (or STID) of the cooperation request terminal, a temporary ID of the cooperation request terminal, or a cooperative cluster ID of the cooperation request terminal, and Resource allocation information for the cooperation request terminal which may include transmission data size, transmission data location, a data transmission scheme (MIMO scheme, PMI, MCS, etc.), data transmit power (power headroom, etc.), and information about ACK/NACK transmission location.

In process S450, since it needs to be possible to confirm that data received through an uplink resource allocated to the first terminal 100a and the second terminal 100b belongs to data of the first terminal 100a, a resource allocation request message transmitted from the second terminal 100b to the BS 200 in process S450 may include the following information:

ID information of the cooperative transmission terminal which may include an MSID (or STID) of the cooperative transmission terminal or a temporary ID of the cooperative transmission terminal, ID information of the cooperation request terminal which may include an MSID (or STID) of the cooperation request terminal or a temporary ID of the cooperation request terminal, A cooperative cluster ID of the cooperation request terminal, and Resource allocation request information of the cooperation request terminal which may include original information size, QoS, etc.

Meanwhile, in process S450, the second terminal 100b may transmit data using an uplink resource allocated to the first terminal 100a by the BS 200 without separately transmitting the uplink resource allocation request message to the BS 200.

Alternatively, in process S450, the first terminal 100a and the second terminal 100b may receive an uplink resource allocated from the BS 200. However, the cooperation request terminal, i.e. the first terminal 100a may discard the received resource allocation information and only the cooperative transmission terminal, i.e. the second terminal 100b, may transmit data using the allocated uplink resource on behalf of the first terminal 100a.

In this case, the cooperative transmission terminal, i.e. the second terminal 100b, requests the BS to allocate the uplink resource and may use information of the cooperation request terminal, i.e. the first terminal 100a, during data transmission. Accordingly, a BS uplink resource allocation request message of a terminal and an uplink resource allocation message of a BS include at least one of the following information:

An MSID or STID of a cooperation request terminal,

A temporary ID of the cooperation request terminal, and

A cooperative cluster ID of the cooperation request terminal.

In process S450, the cooperation request terminal and the cooperative transmission terminal perform uplink resource allocation. However, even in this case, if a BS performs RF combining, either the cooperation request terminal or the cooperative transmission terminal masks a CRC with common information between the terminals and it is desirable that the BS 200 perform the process as if the cooperation request terminal requests BS uplink resource allocation. In this case, the BS may allocate a resource using common ID information between cooperative transmission terminals including the cooperation request terminal.

In cooperative transmission, communication between terminals is desirably restricted to a maximum of rank 1 or rank 2 in a data transfer scheme because it is not easy to estimate a channel between terminals. Especially, it is desirable to use an open-loop MIMO transmission scheme.

For example, a data transmission scheme for communication between terminals may be one of open-loop SM (rank 2), Tx diversity (rate 1)-SFBC, and rank 1 random beamforming transmission schemes.

Figure 12:
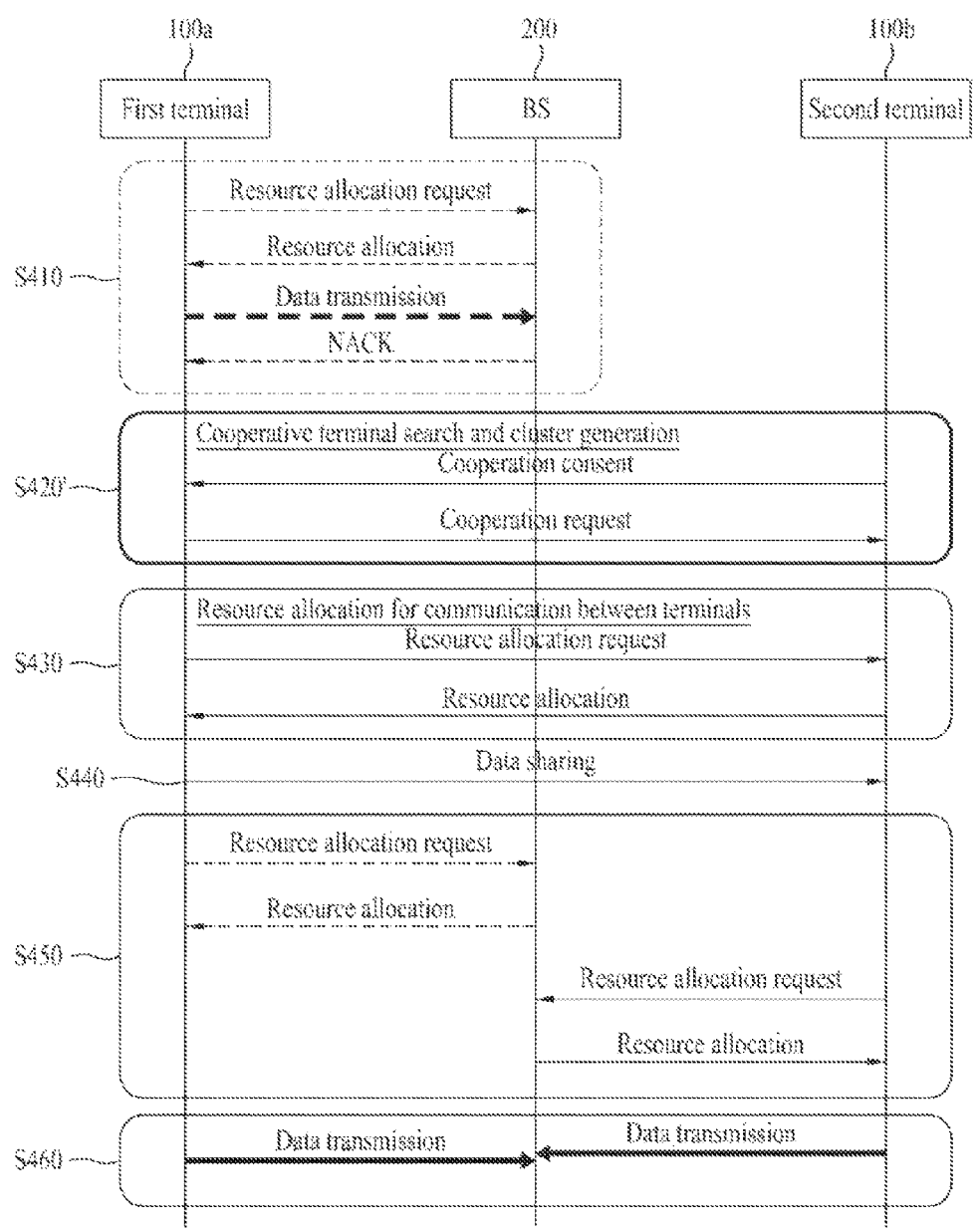
FIG. 12 exemplarily illustrates a modified example of the method shown in FIG. 11.

FIG. 12 exemplarily illustrates a modified example of the method shown in FIG. 11.

Referring to FIG. 12, a cooperative terminal search and cluster formation process 420' is modified as compared to FIG. 11.

Hereinbelow, different parts from description of FIG. 11 will be described and part identical to those of FIG. 11 will be omitted.

During generation of a cooperative cluster in process S420', the second terminal 100b may transmit a cooperation consent message first and the first terminal 100a may transmit a cooperation request message to the second terminal 100b after receiving the cooperation consent message.

In this case, the cooperation consent message of a cooperative terminal candidate, i.e. the second terminal 100b, may include at least one of the following information:

ID information of a cooperative transmission terminal which may include an MSID (or STID) of the cooperative transmission terminal or a temporary ID of the cooperative transmission terminal, Cooperative cluster ID of a cooperation request terminal, and Allocable resource information of the cooperative transmission terminal which may include one or more of resource allocation information (e.g. resource size and resource location), a transmission scheme (e.g. MIMO scheme, PMI, rank indicator, etc.), and ACK/NACK transmission location.

In process S420', the cooperation request message transmitted from the first terminal 100a to the second terminal 100b (i.e. a cooperation request terminal→a cooperative terminal candidate) may include at least one of the following information:

A cooperation request indicator indicating an indicator transmitted from the first terminal to the second terminal, ID information of the cooperation request terminal (e.g. the first terminal) which may include an MSID (or STID) of the cooperation request terminal and a temporary ID of the cooperation request terminal, A cooperative cluster ID of the cooperation request terminal, Channel information for a BS uplink of the cooperation request terminal, which may include a CQI for the BS uplink and a receive SINR for the BS uplink (or downlink), and Resource allocation request information of the cooperation request terminal, which includes at least one of data information of a terminal to be transmitted (original information size, QoS, etc.) and uplink resource allocation information received from a BS (e.g. resource location, allocation size, modulation and coding level, MIMO scheme, PMI, etc. or grant information size, QoS, etc.).

The above-described embodiments and modified examples may be combined. Accordingly, the respective embodiments may be achieved by combination thereof when necessary rather than implemented alone. Those skilled in the art can easily implement such combination and, therefore, a detailed description of such combination will not be given. Nonetheless, such combination is not excluded from the present invention and should be interpreted as being included in the scope of the present invention.

The above embodiments and modified examples may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

For example, the methods according to the present invention may be stored in a storage medium (e.g. an internal memory, a flash memory, a hard disk, etc.) or may be implemented as code or commands within a software program which can be executed by a processor (e.g. a microprocessor). The will be described with reference to FIG. 13.

Figure 13:
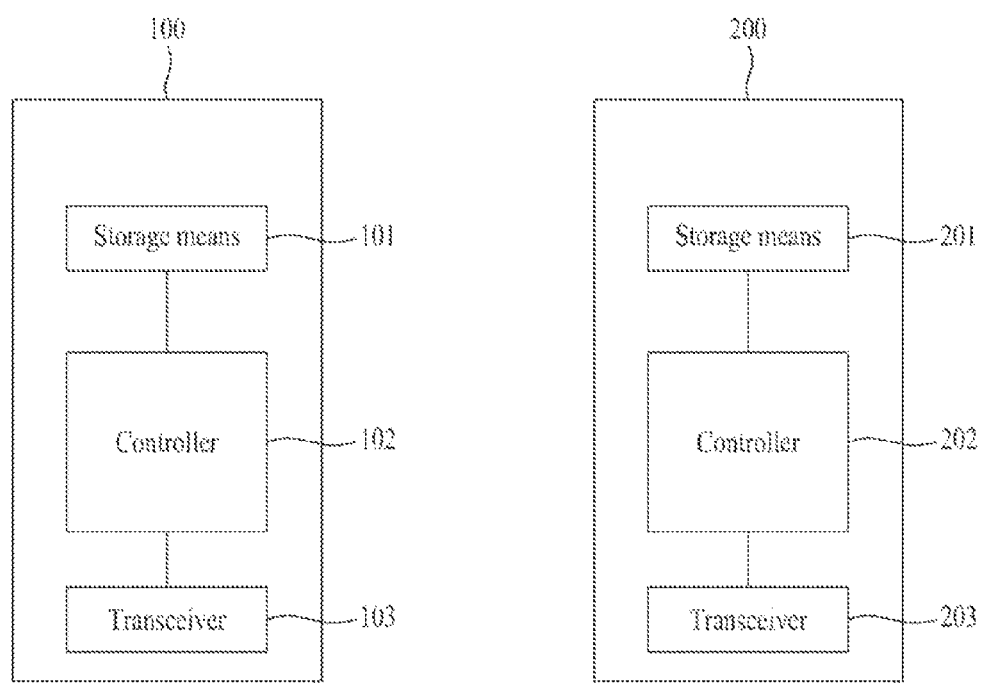
FIG. 13 is a block diagram illustrating the configuration of a terminal 100 and a BS 200 according to the present invention.

FIG. 13 is a block diagram illustrating the configuration of a terminal 100 and a BS 200 according to the present invention.

As shown in FIG. 13, the terminal 100 includes a storage means 101, a controller 102, and a transceiver 103. The BS 200 includes a storage means 201, a controller 202, and a transceiver 203.

The storage means 101 and 201 store the methods shown in FIG. 1 to FIG. 12.

The controllers 102 and 202 control the storage means 101 and 201 and the transceivers 103 and 203. Specifically, the controllers 102 and 202 perform the methods stored in the storage means 101 and 201. The controllers 102 and 202 transmit the above-described signals through the transceivers 103 and 203.

The exemplary embodiments described hereinabove are combinations of elements and features of the present invention. The elements or features should be considered selective unless explicitly mentioned otherwise. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment. It will be obvious that claims that are not explicitly cited in the appended claims may be presented in combination as an exemplary embodiment of the present invention or included as a new claim by subsequent amendment after the application is filed.

In this specification, the exemplary embodiments of the present invention have been described centering on a data transmission/reception relationship between a BS and a terminal. Herein, the BS means a terminal node performing communication directly with a terminal. A specific operation described as performed by a BS may be performed by an upper node of the BS in some cases.

The term 'BS' may be replaced with the terms fixed station, Node B, eNodeB, access point, etc. The term 'terminal' may be replaced with the terms User Equipment (UE), Mobile Station (MS), Subscriber Station (SS), Mobile Subscriber Station (MSS), etc.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. Further, claims which are not explicitly dependent on each other can be combined to provide an embodiment or new claims can be added through amendment after this application is filed.

The invention claimed is:

1. A method for receiving signals from a plurality of terminals by a base station in a wireless communication system, the method comprising:

receiving a first message including a cooperation request indicator from each of the plurality of terminals;

generating a cooperative cluster based on signal power information from the plurality of terminals and location information of the plurality of terminals, wherein the cooperative cluster includes a first terminal and a second terminal, a first temporary ID is assigned to the first terminal within the cooperative cluster, and a second temporary ID is assigned to the second terminal within the cooperative cluster;

transmitting a second message including CRC information and first resource allocation information to the first and second terminals, wherein the CRC information of the second message is masked with a concatenation of the first temporary ID and the second temporary ID; and receiving data of the second terminal from both the first and second terminals according to the first resource allocation information.

2. The method of claim 1, wherein the first resource allocation information includes at least one of a cooperative cluster ID assigned to the cooperative cluster, the second temporary ID, and transmit power information.

3. The method of claim 1, wherein the second terminal transmits a resource allocation request to the first terminal for a transmission of the data from the second terminal to the first terminal, wherein the first terminal transmits second resource allocation information to the first terminal, and wherein the data is transmitted from the second terminal to the first terminal according to the second resource allocation information.

4. The method of claim 3, wherein the resource allocation request includes at least one of the cooperation request indicator, the first temporary ID, and size and location information of the data.

5. The method of claim 3, wherein the second resource allocation information includes at least one of a cooperation acceptance indicator, the second temporary ID, size and location information of allocated resources, and ACK/NACK transmission location information.

6. The method of claim 3, wherein each CRC information of the resource allocation request and the second resource allocation information is masked with the first temporary ID.

7. The method of claim 1, further comprising:
transmitting a paging message to the first terminal before transmitting the second message.

8. A method for transmitting signals to a base station by a first terminal in cooperation with a second terminal, the method comprising:

transmitting a first message including a cooperation request indicator to the base station, wherein a cooperative cluster is constructed by the base station based on signal power information from the first and second terminals and location information of the first and second terminals, a first temporary ID is assigned to the first terminal within the cooperative cluster, and a second temporary ID is assigned to the second terminal within the cooperative cluster;

receiving a second message including CRC information and first resource allocation information from the base station, wherein the CRC information of the second message is masked with a concatenation of the first temporary ID and the second temporary ID;

receiving data from the second terminal; and transmitting the data to the base station according to the first resource allocation information.

9. The method of claim 8, wherein the first resource allocation information includes at least one of a cooperative cluster ID assigned to the cooperative cluster, the second temporary ID, and transmit power information.

10. The method of claim 8, wherein the receiving the data includes:

receiving a resource allocation request from the second terminal for a transmission of the data from the second terminal to the first terminal, transmitting second resource allocation information to the first terminal, and receiving the data from the second terminal according to the second resource allocation information.

11. The method of claim 10, wherein the resource allocation request includes at least one of the cooperation request indicator, the first temporary ID, and size and location information of the data.

12. The method of claim 10, wherein the second resource allocation information includes at least one of a cooperation acceptance indicator, the second temporary ID, size and location information of allocated resources, and ACK/NACK transmission location information.

13. The method of claim 10, wherein each CRC information of the resource allocation request and the second resource allocation information is masked with the first temporary ID.

14. The method of claim 8, further comprising:
receiving a paging message from the base station before receiving the second message.

15. A method for transmitting signals to a base station by a second terminal in cooperation with a first terminal, the method comprising:

transmitting a first message including a cooperation request indicator to the base station, wherein a cooperative cluster is constructed by the base station based on signal power information from the first and second terminals and location information of the first and second terminals, a first temporary ID is assigned to the first terminal within the cooperative cluster, and a second temporary ID is assigned to the second terminal within the cooperative cluster;

receiving a second message including CRC information and first resource allocation information from the base station, wherein the CRC information of the second message is masked with a concatenation of the first temporary ID and the second temporary ID;

transmitting data to the first terminal; and transmitting the data to the base station according to the first resource allocation information.

16. The method of claim 15, wherein the first resource allocation information includes at least one of a cooperative cluster ID assigned to the cooperative cluster, the second temporary ID, and transmit power information.

17. The method of claim 15, wherein the transmitting the data includes:

transmitting a resource allocation request to the first terminal for a transmission of the data from the second terminal to the first terminal, receiving second resource allocation information from the second terminal, and transmitting the data to the first terminal according to the second resource allocation information.

18. The method of claim 17, wherein the resource allocation request includes at least one of the cooperation request indicator, the first temporary ID, and size and location information of the data.

19. The method of claim 17, wherein the second resource allocation information includes at least one of a cooperation acceptance indicator, the second temporary ID, size and location information of allocated resources, and ACK/NACK transmission location information.

20. The method of claim 17, wherein each CRC information of the resource allocation request and the second resource allocation information is masked with the first temporary ID.

21. A terminal configured to transmit signals to a base station in cooperation with another terminal, the terminal comprising:
- a transceiver; and
- a controller configured to:
  - transmit a first message including a cooperation request indicator to the base station,
  - wherein a cooperative cluster is constructed by the base station based on signal power information from the first and second terminals and location information of the first and second terminals, a first temporary ID is assigned to the first terminal within the cooperative cluster, and a second temporary ID is assigned to the second terminal within the cooperative cluster;
  - receive a second message including CRC information and first resource allocation information from the base station,
  - wherein the CRC information of the second message is masked with a concatenation of the first temporary ID and the second temporary ID;
  - transmit data to or receive data from the other terminal; and
  - transmit the data to the base station according to the first resource allocation information.

* * * * *